United States Patent
Shinzaki et al.

(10) Patent No.: US 9,299,006 B2
(45) Date of Patent: Mar. 29, 2016

(54) AUTHENTICATION DEVICE AND METHOD

(71) Applicant: FUJITSU LIMITED, Kawasaki-shi, Kanagawa (JP)

(72) Inventors: Takashi Shinzaki, Kawasaki (JP); Toshio Endoh, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 19 days.

(21) Appl. No.: 14/322,042

(22) Filed: Jul. 2, 2014

(65) Prior Publication Data
US 2015/0036893 A1 Feb. 5, 2015

(30) Foreign Application Priority Data
Jul. 30, 2013 (JP) .................................. 2013-158126

(51) Int. Cl.
*G06K 9/00* (2006.01)
*G06K 9/62* (2006.01)
*H04L 9/32* (2006.01)
*G06F 21/32* (2013.01)

(52) U.S. Cl.
CPC .............. *G06K 9/6203* (2013.01); *G06F 21/32* (2013.01); *G06K 9/00033* (2013.01); *G06K 9/00912* (2013.01); *H04L 9/3231* (2013.01); *G06K 2009/00932* (2013.01)

(58) Field of Classification Search
None
See application file for complete search history.

(56) References Cited

U.S. PATENT DOCUMENTS

| 5,719,951 | A | 2/1998 | Shackleton et al. |
| 6,188,776 | B1 | 2/2001 | Covell et al. |
| 2002/0048014 | A1 | 4/2002 | Kono et al. |
| 2009/0220156 | A1* | 9/2009 | Ito ...................... G06K 9/00248 382/201 |
| 2011/0043610 | A1* | 2/2011 | Ren ......................... G06T 5/002 348/46 |
| 2014/0010458 | A1* | 1/2014 | Nakamura ........ G06F 17/30244 382/195 |

FOREIGN PATENT DOCUMENTS

| EP | 2 610 820 A2 | 7/2013 |
| EP | 2 642 428 A2 | 9/2013 |
| JP | 2-61790 | 12/1990 |
| JP | 5-508951 | 12/1993 |
| JP | 7-129770 | 5/1995 |
| JP | 2000-511316 | 8/2000 |
| JP | 2002-92616 | 3/2002 |

OTHER PUBLICATIONS

Extended European Search Report issued May 15, 2015 in corresponding European Patent Application No. 14176890.3.
Byung Jun Kang et al., "Multimodal biometric method that combines veins, prints, and shape of a finger", Optical Engineering, 50(1), 017201, Jan. 2011, pp. 1-13.
Soyuj Kumar Sahoo et al., "Multimodal Biometric Person Authentication: A Review", IETE Technical Review, vol. 29, Issue 1, Jan.-Feb. 2012, pp. 54-75.

* cited by examiner

*Primary Examiner* — Sumati Lefkowitz
*Assistant Examiner* — David Perlman
(74) *Attorney, Agent, or Firm* — Staas & Halsey LLP

(57) ABSTRACT

An authentication device includes: a memory; and a processor coupled to the memory and configured to: acquire a plurality of images with regard to a certain living body, extract first biometric information from each of the plurality of images, perform an alignment between the plurality of images, based on the first biometric information, calculate a coefficient based on feature of the certain living body, the feature being identified by a result of the alignment, and generate a normalized image by normalizing at least one image from among the plurality of images based on the coefficient.

11 Claims, 14 Drawing Sheets

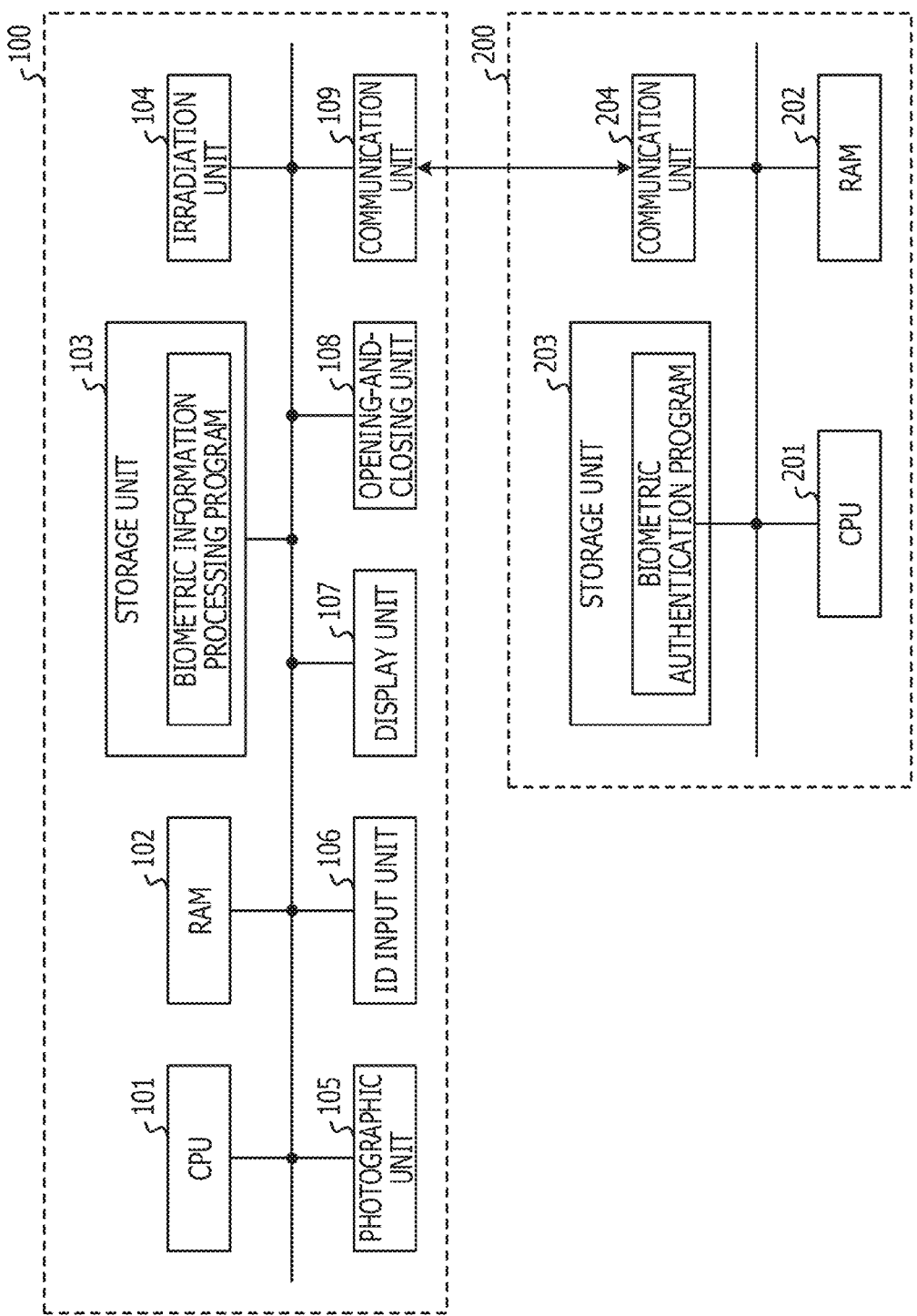

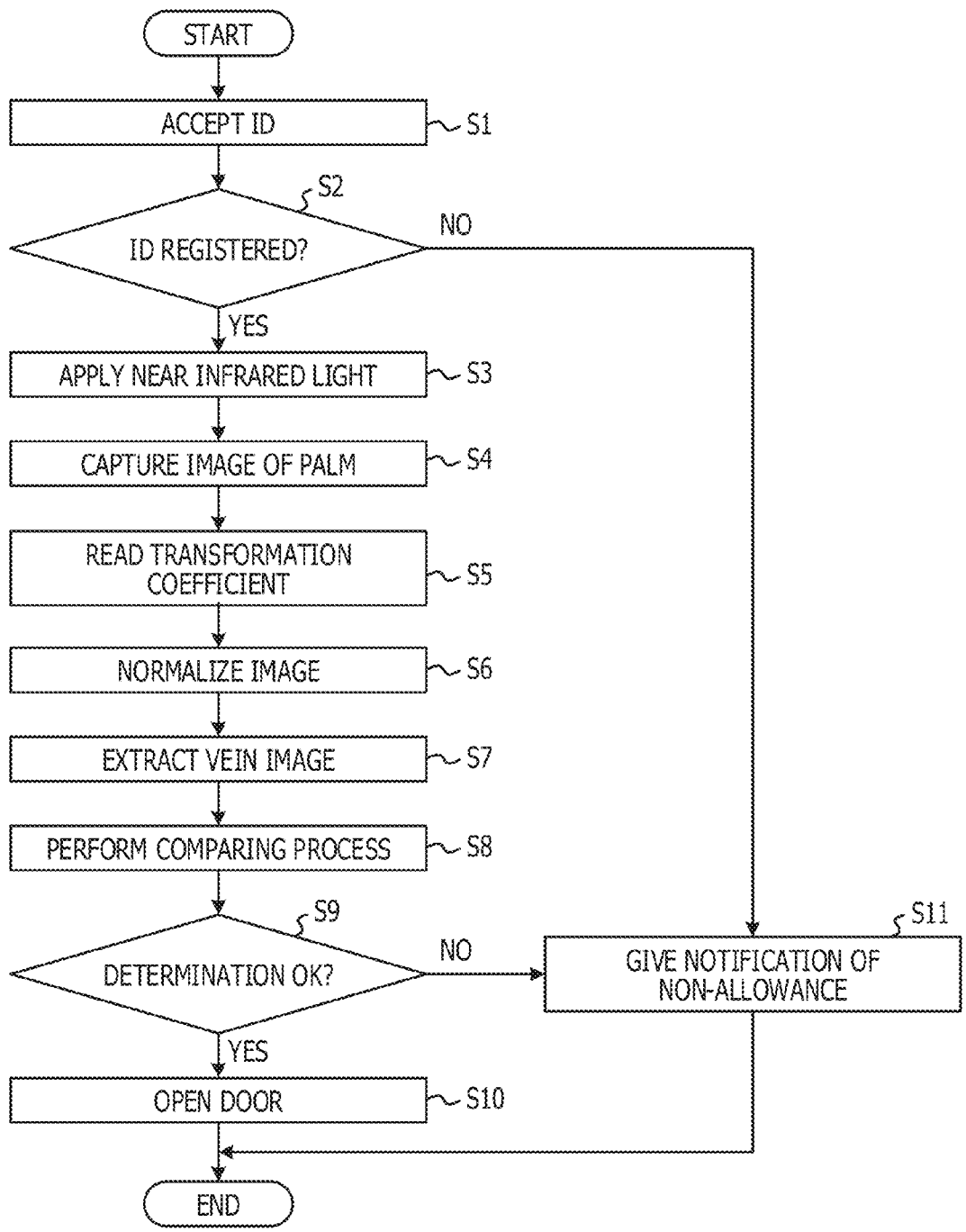

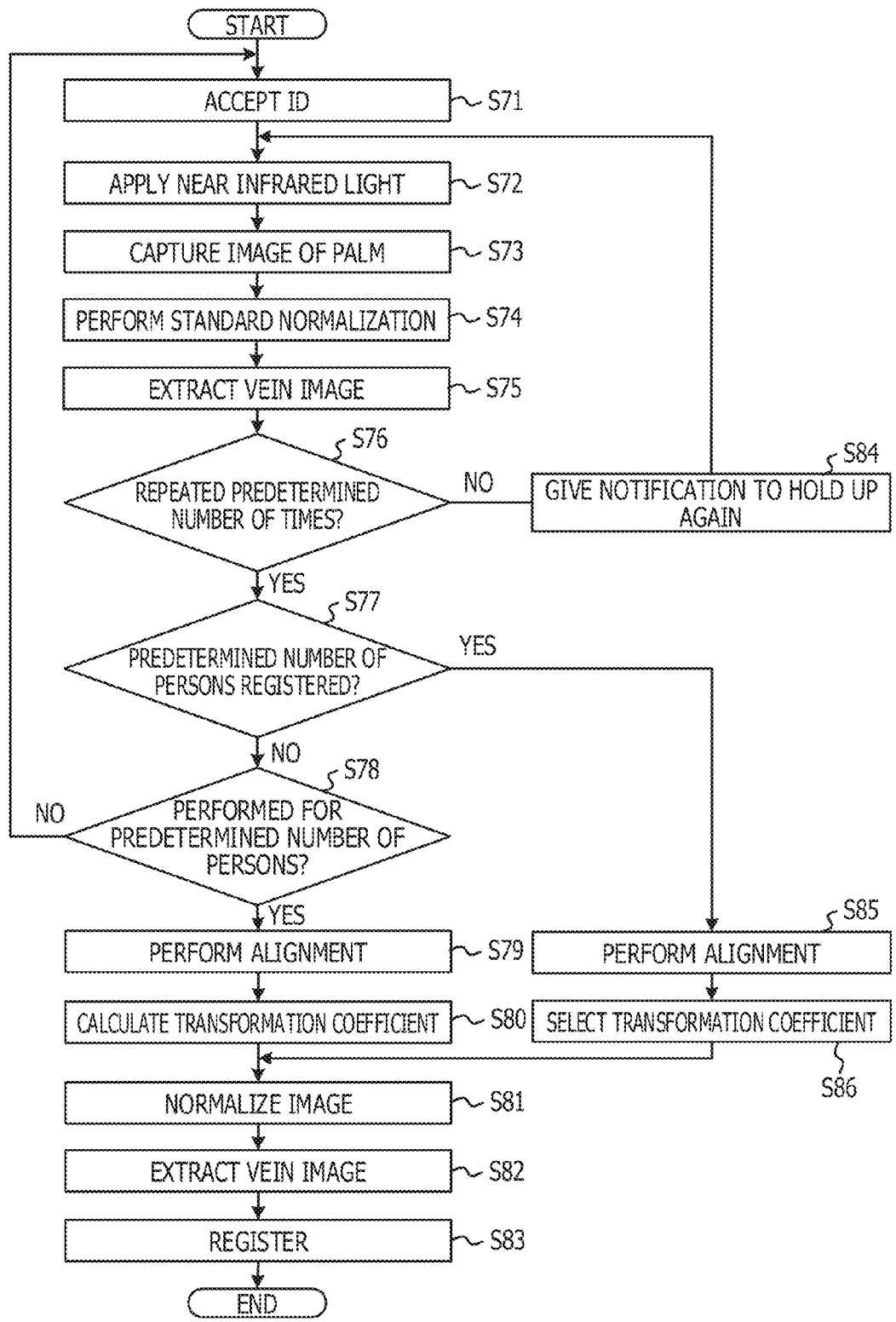

AUTHENTICATION DEVICE AND METHOD

CROSS-REFERENCE TO RELATED APPLICATION

This application is based upon and claims the benefit of priority from the prior Japanese Patent Application No. 2013-158126, filed on Jul. 30, 2013, the entire contents of which are incorporated herein by reference.

FIELD

The technology disclosed in the present embodiments is related to an authentication device and a method for processing biometric information.

BACKGROUND

To date, biometric authentication technology using biometric information of individuals, such as fingerprints, faces, or veins, has been utilized as a way of verifying the identity of a person without anybody's help when that person enters and exits a facility. Unlike a magnetic card or a personal identification number (PIN), biometric authentication using biometric information has the advantage that there are no concerns about loss (forgetfulness) or theft. In the biometric authentication technology, authentication is performed by performing comparing between biometric information registered in advance (registered data) and biometric information presented at the time of authentication (comparing data). However, biometric information varies to some extent even if the information is on the same person, and therefore some variations have to be permitted for authentication. Typically, the similarity between both is expressed in terms of the degree of similarity, and a person who presented biometric information is identified as a registered person him- or herself if the degree of similarity is greater than a given threshold. In biometric authentication, it is desired that accuracy in authentication be high. For this reason, methods for raising the degree of similarity between registered data and comparing data for the same person are used. The methods for raising the degree of similarity between registered data and comparing data are broadly classified into those performed during feature extraction and those performed during a comparing process.

Normalization is an example of a method performed during feature extraction. This is a technique of combining images or biometric information obtained when a posture (position, orientation, shape) of a human body presented to a photographic device is captured in such a manner that the posture is changed to a normal posture. Japanese Examined Patent Application Publication No. 2-61790 discloses a method in which the outline of a target is detected and, based on this, the amount of position displacement of the target is determined. Japanese Laid-open Patent Publication No. 2002-92616 discloses a technology in which the outline of a finger is detected and, based on this, errors in the location, as well as the orientation, of a vein image are corrected. Japanese National Publication of International Patent Application No. 5-508951 discloses a scheme in which locations of parts, such as eyes, arranged in a face are determined and the locations are normalized. Japanese National Publication of International Patent Application No. 2000-511316 discloses a scheme in which the relationship between an amount that may be computed from an image and hidden data representing a posture is learned using training data.

In contrast, alignment based on template comparing is an example of a method performed during a comparing process. Template comparing is used in the image-processing field in general (for example, refer to Japanese Laid-open Patent Publication No. 7-129770). For example, Japanese Laid-open Patent Publication No. 7-129770 discloses a method for removing the influence of misalignment between registered data and comparing data by repeatedly calculating the degree of similarity between the registered data and the comparing data while gradually changing the positional relationship between the registered data and the comparing data, and regarding the maximum value of the calculated degrees of similarity between the registered data and the comparing data as the final degree of similarity between them.

SUMMARY

According to an aspect of the invention, an authentication device includes: a memory; and a processor coupled to the memory and configured to: acquire a plurality of images with regard to a certain living body, extract first biometric information from each of the plurality of images, perform an alignment between the plurality of images, based on the first biometric information, calculate a coefficient based on feature of the certain living body, the feature being identified by a result of the alignment, and generate a normalized image by normalizing at least one image from among the plurality of images based on the coefficient.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram for explaining a hardware configuration of a biometric information authentication device according to a first embodiment;

FIG. 4 is a flowchart illustrating an outline of processing performed by the biometric information authentication device at the time of authentication;

FIG. 14 is a flowchart illustrating an outline of processing performed by the biometric information authentication device at the time of registration.

DESCRIPTION OF EMBODIMENTS

Figure 2A:
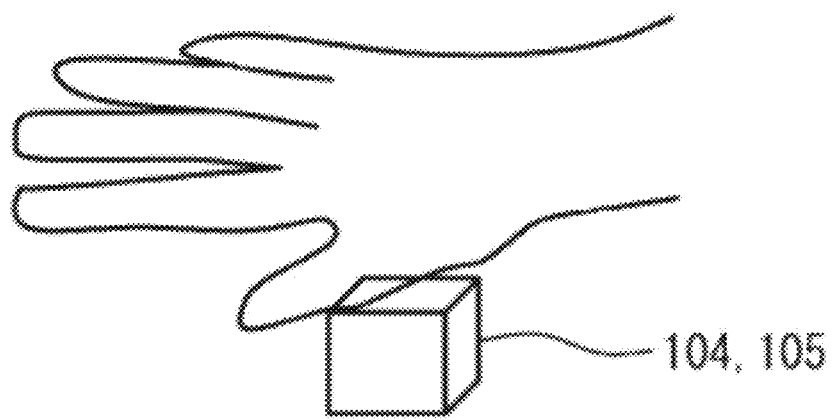
FIG. 2A is an illustration exemplifying an irradiation unit and a photographic unit.

Biometric authentication using biometric information, such as a palm vein, has the following problems. By way of example, a living body changes in various ways, and therefore sufficient normalization is not achieved with a scheme in which the position and the orientation are simply normalized based on the outline. It is difficult to apply normalization for each part to a living body whose structure is not clearly seen. For a similar reason, it is difficult to create training data in a usual format, and therefore it is also difficult to apply a learning scheme as is. Although a method in which a living body is three-dimensionally measured and normalization is performed may be considered, a special photographic device is used for this, resulting in an increase in device cost. In contrast, although a method in which alignment is performed in a comparing process permits both of registered data and comparing data to be referred to and therefore is powerful, the amount of calculation in the comparing process is large. In addition, it has been desired in recent years, from a viewpoint of protection of personal information, that a comparing process be performed on encrypted biometric information remaining as is, and it has been expected that alignment during the comparing process, which serves as a hindrance to the desired comparing process, be omitted.

In one aspect, it is an object of the present disclosure to provide a biometric information authentication device and a method for processing biometric information that may raise the degree of similarity between registered data and comparing data for the same person.

Hereinafter, embodiments will be described with reference to the drawings.

First Embodiment

FIG. 1 is a block diagram for explaining a hardware configuration of a biometric information authentication device 300 according to a first embodiment. The biometric information authentication device 300 is, by way of example, an authentication system that uses a vein of a palm as biometric information and applies a combination of the vein and an automatic door to room access control. In this embodiment, 1:1 authentication, that is, a configuration in which a user's ID is accepted at the time of authentication is handled.

With reference to FIG. 1, the biometric information authentication device 300 has, by way of example, a configuration in which a terminal 100 and a server 200 are connected through communication units. The terminal 100 is, by way of example, an automatic door and includes a CPU 101, a RAM 102, a storage unit 103, an irradiation unit 104, a photographic unit 105, an ID input unit 106, a display unit 107, an opening-and-closing unit 108, a communication unit 109, and so forth. Each of these devices is connected by a bus or the like. The server 200 includes a CPU 201, a RAM 202, a storage unit 203, a communication unit 204, and so forth.

The central processing unit (CPU) 101 is a central processing unit. The CPU 101 includes one or more cores. The random access memory (RAM) 102 is a volatile memory that temporarily stores a program executed by the CPU 101, data processed by the CPU 101, and so forth. The storage unit 103 is a nonvolatile storage device. As the storage unit 103, for example, a read only memory (ROM), a solid state drive (SSD) using a flash memory or the like, a hard disk driven by a hard disk drive, or the like may be used. A biometric information processing program according to this embodiment is stored in the storage unit 103. The biometric information processing program stored in the storage unit 103 is developed in the RAM 102 such that the program may be executed. The CPU 101 executes the biometric information processing program developed in the RAM 102. Thereby, each piece of processing by the terminal 100 is performed.

FIG. 2A is an illustration exemplifying the irradiation unit 104 and the photographic unit 105. The irradiation unit 104 is a device that emits near infrared light, for example, a light emitting diode (LED) that emits near infrared light. Although not limited in particular, the photographic unit 105 is a complementary metal oxide semiconductor (CMOS) camera provided with a filter (a visible light blocking filter) that blocks visible light rays, a charge coupled device (CCD) camera, or the like. As illustrated in FIG. 2A, the irradiation unit 104 and the photographic unit 105 may be unified. The photographic unit 105 acquires, by way of example, an image of a palm held up.

Figure 2B:
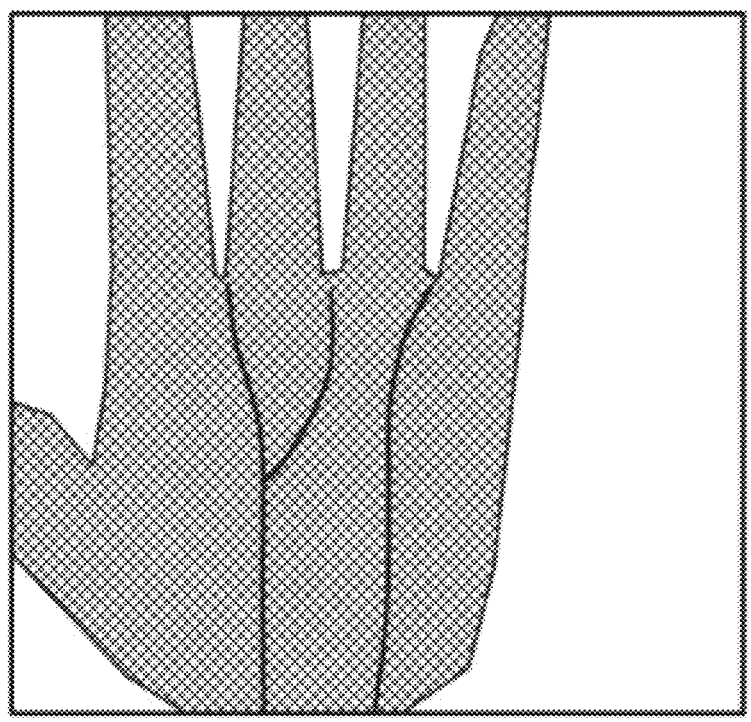
FIG. 2B is an illustration representing a result of image capturing of a photographic unit.

FIG. 2B is an illustration representing a result of image capturing performed by the photographic unit 105. The result of image capturing is expressed as an image. An image is a two-dimensional array made up of many pixels, and each pixel has a value (pixel value) in accordance with the intensity of light. With reference to FIG. 2B, veins are rendered black. Parts other than the veins of the palm are rendered in gray. Areas other than the palm are rendered in white.

With reference again to FIG. 1, the ID input unit 106 is an input device, such as a keyboard or an IC card reader. The display unit 107 is a display device, such as a liquid crystal display or an electroluminescent panel, and displays processing results and so forth of the terminal 100 and the server 200. Alternatively, the display unit 107 may be a lamp, a buzzer, or the like. The opening-and-closing unit 108 is a device that opens and closes an automatic door. The communication unit 109 is a communication device that sends and receives data from the communication unit 204 of the server 200.

The CPU 201 is a central processing unit. The CPU 201 includes one or more cores. The RAM 202 is a volatile memory that temporarily stores a program executed by the CPU 201, data processed by the CPU 201, and so forth. The storage unit 203 is a nonvolatile storage device. As the storage unit 203, for example, a ROM, a solid state drive using a flash memory or the like, a hard disk driven by a hard disk drive, or the like may be used. A biometric authentication program according to this embodiment is stored in the storage unit 203. The biometric authentication program stored in the storage unit 203 is developed in the RAM 202 such that the program may be executed. The CPU 201 executes the biometric authentication program developed in the RAM 202. Thereby, each piece of processing by the server 200 is performed.

Figures 3A, 3B:
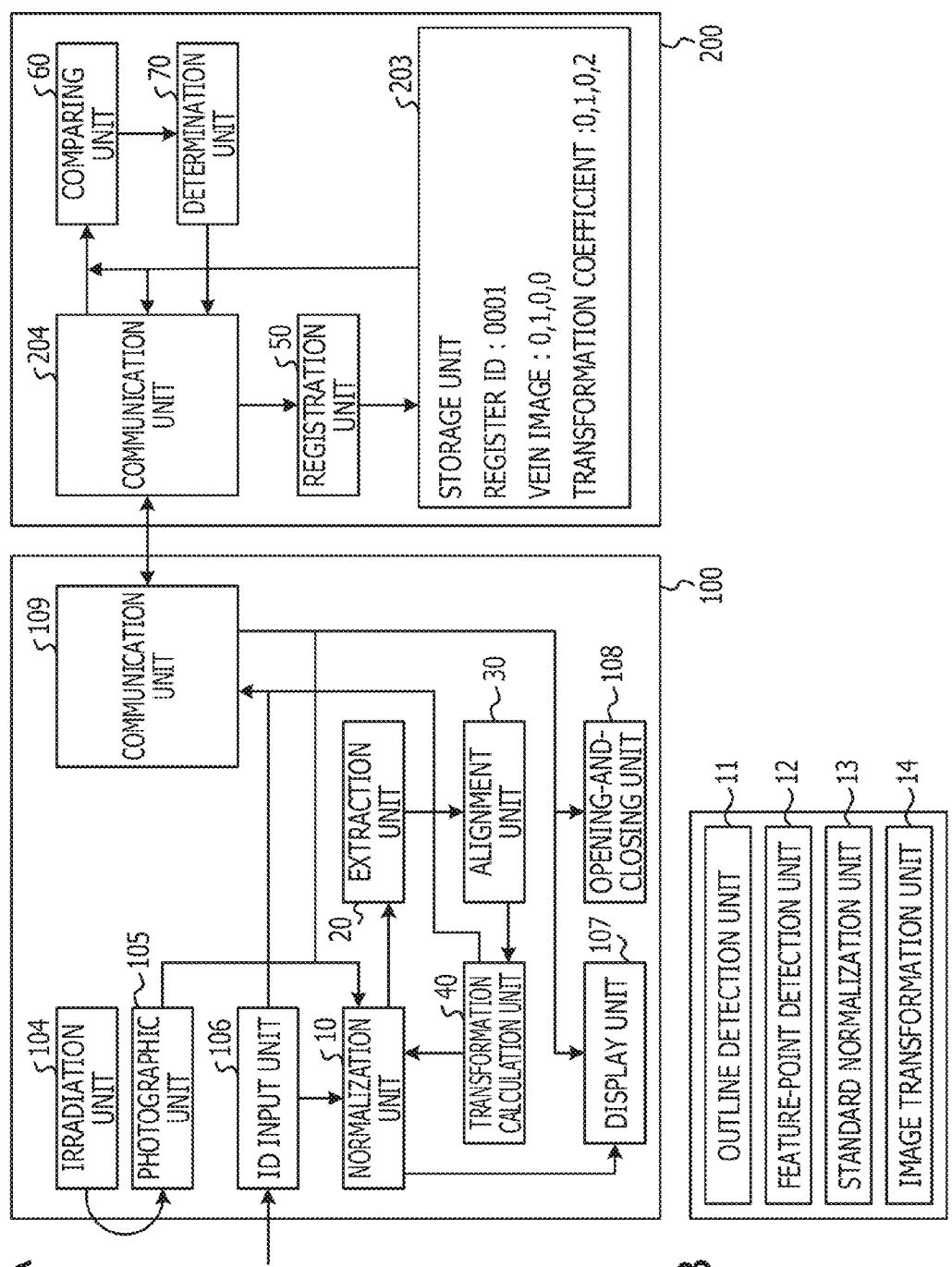
FIG. 3A and FIG. 3B are functional block diagrams of the biometric information authentication device.

FIG. 3A is a functional block diagram of the biometric information authentication device 300. With reference to FIG. 3A, the CPU 101 of the terminal 100 executes a biometric information processing program, and thereby a normalization unit 10, an extraction unit 20, an alignment unit 30, and a transformation calculation unit 40 are further implemented. In addition, the CPU 201 of the server 200 executes the biometric authentication program, and thereby a registration unit 50, a comparing unit 60 and a determination unit 70 are further implemented. With reference to FIG. 3B, the normalization unit 10 includes an outline detection unit 11, a feature-point detection unit 12, a standard normalization unit 13, and an image transformation unit 14.

FIG. 4 is a flowchart illustrating an outline of processing performed by the biometric information authentication device 300 at the time of authentication. With reference to FIG. 4, the ID input unit 106 receives an ID from a user who wishes to enter a room, and sends it to the comparing unit 60 (step S1). The comparing unit 60 determines whether the ID in question has been registered in the storage unit 203 (step S2). If "Yes" is the determination in step S2, the irradiation unit 104 irradiates the user's palm with near infrared light (step S3).

Next, the photographic unit 105 captures an image of the palm (step S4). Next, the normalization unit 10 reads a transformation coefficient associated with the ID of the user in question from the storage unit 203 (step S5). The transformation coefficient represents a correspondence between the outline of a hand and the inside of the hand. The normalization unit 10 detects feature points set on the outline of the hand from the captured image, and normalizes the image according to the transformation coefficient (step S6).

Next, the extraction unit 20 extracts a vein image from the normalized image (step S7). The extracted vein image is transferred to the comparing unit 60. The comparing unit 60 calculates the degree of similarity between the extracted vein image and a vein image registered in association with the corresponding ID (step S8). A greater degree of similarity between the vein images indicates that both of the vein images are more similar. The determination unit 70 determines whether the calculated degree of similarity between the extracted vein image and the registered vein image is greater than a given threshold (step S9). The result of determination is returned to the terminal 100. If "Yes" is the determination in step S9, the opening-and-closing unit 108 opens an automatic door (step S10). At the time of opening of the automatic door, the display unit 107 may notify the user of an authentication result indicating that access to the room is allowed. If "No" is the determination in step S2 or in step S9, the display unit 107 notifies the user that access to the room is not allowed (step S11).

Figure 5:
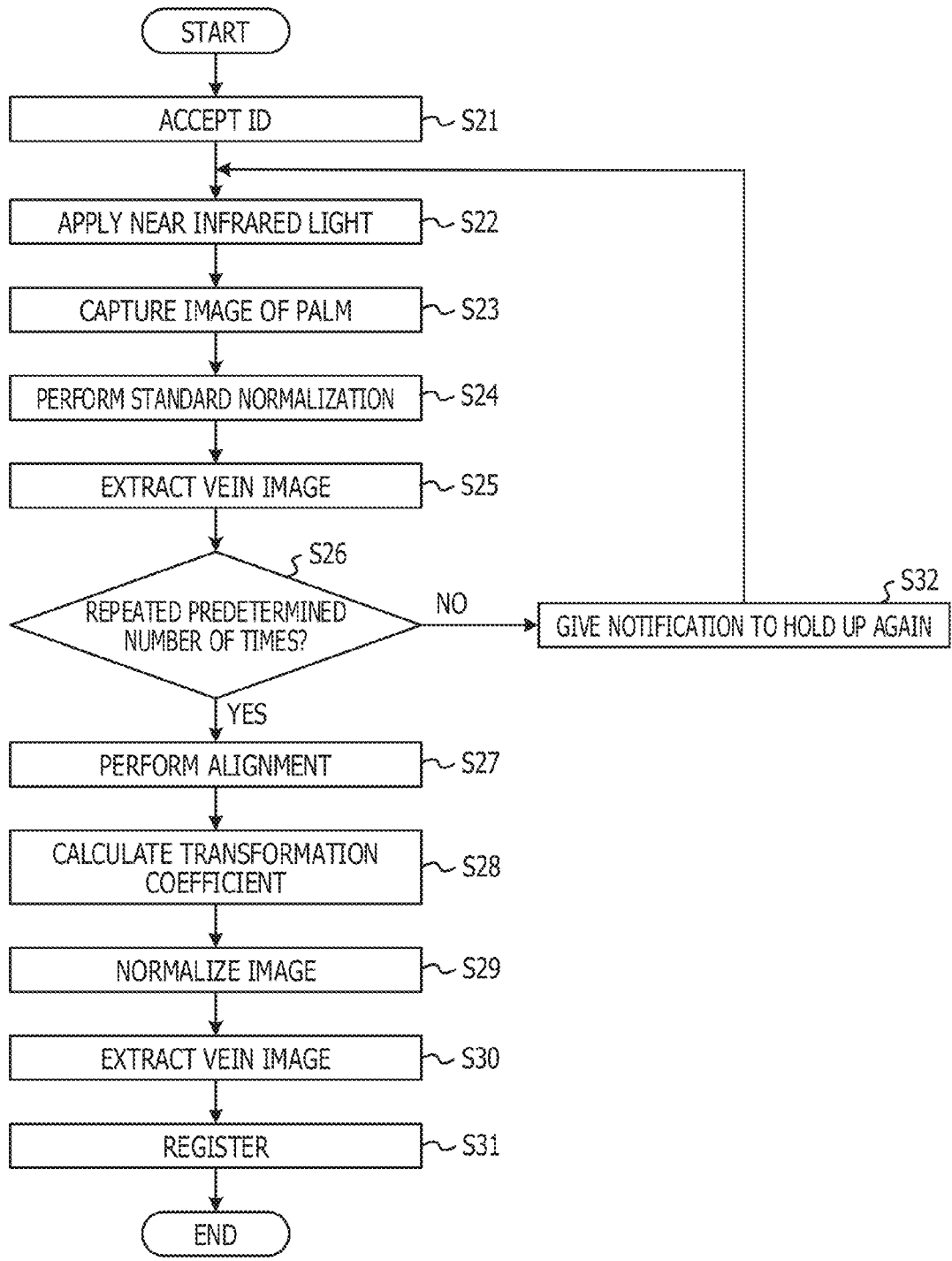
FIG. 5 is a flowchart illustrating an outline of processing performed by the biometric information authentication device at the time of registration of biometric information.

FIG. 5 is a flowchart illustrating an outline of processing performed by the biometric information authentication device 300 at the time of registration of biometric information. With reference to FIG. 5, the ID input unit 106 receives an ID from a user who wishes to enter a room (step S21). Next, the irradiation unit 104 irradiates a user's palm with near infrared light (step S22). Next, the photographic unit 105 captures an image of the palm (step S23). Next, the normalization unit 10 temporarily stores the captured image and detects feature points set on the outline of a hand from the captured image, and, based on the feature points, normalizes the image under a standard normalization scheme that does not use a transformation coefficient (step S24). Next, the extraction unit 20 extracts a vein image from the normalized image (step S25). The alignment unit 30 temporarily stores the extracted vein image.

The alignment unit 30 determines whether the processing of step S22 to step S25 has been repeated a predetermined number of times (step S26). If "Yes" is the determination in step S26, the alignment unit 30 performs alignment between the stored vein images (step S27). The transformation calculation unit 40 calculates a transformation coefficient based on the results of alignment and detected feature points (step S28). The normalization unit 10 again normalizes the stored, captured image using the calculated transformation coefficient (step S29). The extraction unit 20 extracts a vein image from the normalized image (step S30). Next, the registration unit 50 stores the vein image and the transformation coefficient in association with the ID (step S31). At this time, all the obtained vein images may be stored in the storage unit 203. Alternatively, a vein image selected based on a predetermined standard (for example, a first vein image) may be stored in the storage unit 203.

If "No" is the determination in step S26, the display unit 107 instructs the user to hold up a hand again (step S32). Thereafter, the processing of step S22 to step S26 is repeated.

Subsequently, details of the normalization unit 10 will be described. The outline detection unit 11 detects the outline of a hand in the image. One approach for detecting the outline of a hand in an image will be illustrated below. In a captured image, the background is bright, and an area corresponding to the hand is represented as a dark pattern. Accordingly, the outline detection unit 11 detects the outline of a hand, for example, by binarizing the captured image as in the following steps (1) to (4). The outline detection unit 11 prepares an output image for storing the resultant hand outline.

(1) Preparation

The outline detection unit 11 sets a pixel of interest at the upper left of an image.

(2) Binarization

If, regarding the captured image, the pixel value of the pixel of interest is larger than a prescribed threshold 1, the outline detection unit 11 determines the pixel of interest as the background and writes a pixel value of 0 to the pixel of interest of the output image. Otherwise, the outline detection unit 11 determines the pixel of interest as a hand region, and writes a pixel value of 1 to the pixel of interest of the output image.

(3) Movement of Pixel of Interest

The outline detection unit 11 moves the pixel of interest to the right by one. If the pixel of interest is positioned at the right end, the outline detection unit 11 moves the pixel of interest to the left end in the next lower row. If the pixel of interest is positioned at the lower right, the outline detection unit 11 finishes processing.

(4) Repetition

The outline detection unit 11 repeats the aforementioned processing.

Figure 6A:
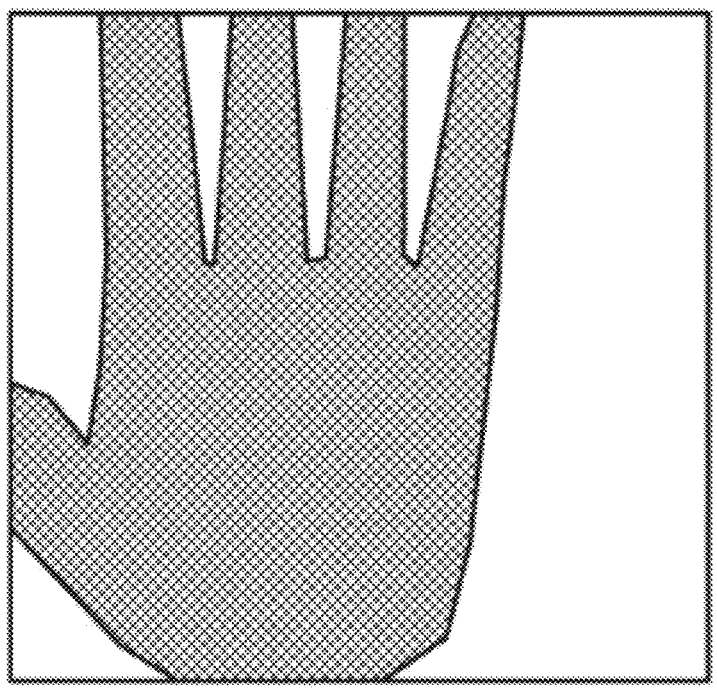
FIG. 6A and FIG. 6B are illustrations representing the outline of a hand and feature points.

A pixel value smaller than an average pixel value of the background may be used. In the case where pixel values are in the range from 0 to 255, a pixel value of 150 is used, for example. The outline detection unit 11 scans all the pixels of the output image one by one after the binarization, and if the pixel of interest has a pixel value of 1, which represents the hand region, and the next pixel has a pixel value of 0, which represents the background, the outline detection unit 11 changes the value of the pixel of interest to a pixel value of 2, which represents the outline. Thereby, the outline of the hand is detected. FIG. 6A is an illustration representing an example of detection of a hand outline. Note that, in FIG. 6A, a region of pixels for which a pixel value of 1 is set is illustrated by hatching, and pixels for which a pixel value of 2 is set are rendered black. Note that regions of pixels for which a pixel value of 0 is set are white.

Next, the feature-point detection unit 12 detects feature points from the hand outline. As feature points, points corresponding to the root of a finger and both ends of a wrist, for example, may be used. Here, the root of a finger refers to a web portion between fingers. One approach for detecting the root of a finger will be illustrated. Here, a hand is to be held up so that fingers are positioned on the upper side of an image. Additionally, an image representing a hand outline detected by the outline detection unit 11 is used.

(1) Preparation

The feature-point detection unit 12 prepares an array in which coordinate values are to be stored. The feature-point detection unit 12 prepares a variable for storing the number of points, and initializes it to 0.

(2) Processing

The feature-point detection unit 12 scans all the pixels of the image one by one in order, and if a pixel having a pixel value of 2, which represents the hand outline, is found, the feature-point detection unit 12 examines the pixel values of pixels on the right and left sides of the found pixel. If both the pixels have a pixel value of 1, which represents the hand region, the feature-point detection unit 12 determines that the image represents the root of a finger, records coordinate values of the pixel in the array, and increments the value of the variable for storing, by 1.

Note that a coordinate system for representing coordinate values of a pixel may be expressed in this embodiment by a coordinate system in which the origin is taken at the upper left of the image, the horizontal direction is taken as the x-axis (positive on the right side of the image), the vertical direction is taken as the y-axis (positive on the lower side of the image). Both x and y coordinate values corresponding to a pixel are non-negative integers. Each of their maximum values is the image size minus 1.

One approach for detecting both ends of a wrist will be illustrated. Here, the wrist is to be held up so as to be positioned at the bottom of the image.

(1) Preparation

The feature-point detection unit 12 prepares variables for storing the values of coordinates of the right end and the left end of the wrist are stored. The feature-point detection unit 12 substitutes −1 for the x-coordinate of the variable for the left end, and substitutes a large number equal to or larger than the size of the image for the x-coordinate of the variable for the right end.

(2) Processing

The feature-point detection unit 12 scans only a predetermined number of rows (for example, 1% of all the rows) from the lowermost row of the image, and performs the following processing if a pixel having the value of 2, which represents the outline of the hand, is found. If a left-side adjacent pixel has a pixel value of 0, which represents the background, and the x-coordinate value of the pixel of interest is larger than the x-coordinate value of the variable for the left end, the feature-point detection unit 12 substitutes the coordinate values of the pixel of interest for the variable for the left end. If a right-side adjacent pixel has a pixel value of 0, which represents the background, and the x-coordinate value of the pixel of interest is smaller than the x-coordinate value of the variable for the right end, the feature-point detection unit 12 substitutes the coordinate values of the pixel of interest for the variable for the right end. After the aforementioned processing, if the x-coordinate value of the variable for the left end or the x-coordinate value of the variable for the right end remains at its initial value, the feature-point detection unit 12 determines that both ends of the wrist have not been found. In this case, the feature-point detection unit 12 captures an image again as appropriate.

Figure 6B:
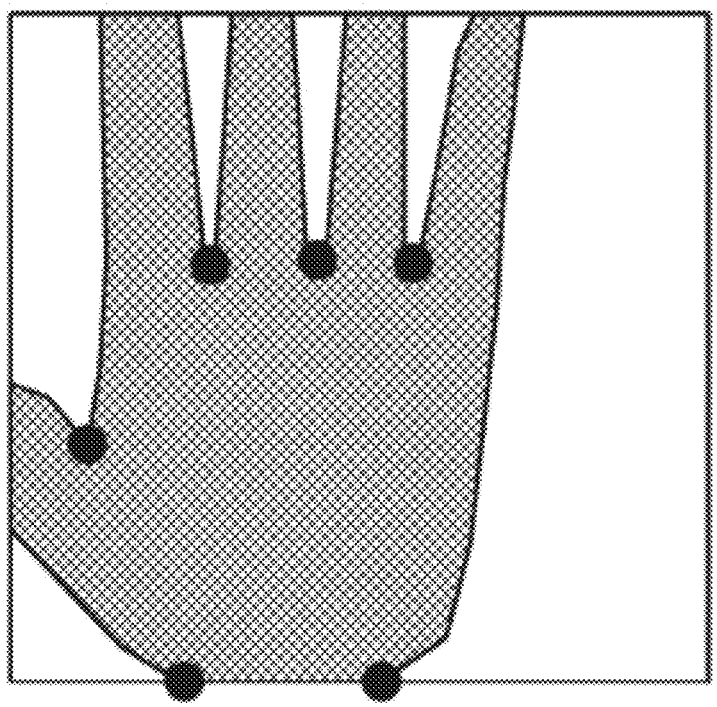

FIG. 6B and Table 1 are drawings illustrating results of detection of feature points for the drawing of FIG. 6A. In FIG. 6B, detection positions are indicated by black circles.

TABLE 1

| Root of finger | (10, 70) | (28, 42) | (42, 40) | (53, 42) |
|---|---|---|---|---|
| Both ends of wrist | (24, 99) | (53, 99) | | |

Next, the standard normalization unit 13 performs standard normalization processing that does not use a transformation coefficient. In particular, the standard normalization unit 13 transforms a captured image, based on coordinate values of feature points of the outline of a hand. One approach will be illustrated below. An image for storing a result of normalization is prepared.

(1) Preparation

The standard normalization unit 13 determines minimum values and maximum values of coordinate values of a feature point of the outline of a hand for x and y, respectively, such that they are $x_{min}$, $x_{max}$, $y_{min}$, and $y_{max}$. However, in view of the bilateral symmetry, a feature point corresponding to the root of the thumb is excluded here. Whether the feature point corresponds to the root of the thumb may be determined, for example, from a feature point having a y-coordinate value closest to the average of y-coordinates of feature points. The size of an image for storing a result of normalization is assumed to be, for example, $(x_{max}-x_{min}+1)\times(y_{max}-y_{min}+1)$. The standard normalization unit 13 sets a pixel of interest at the upper left of a normalized image. The standard normalization unit 13 assumes that variables representing coordinate values of the pixel of interest are u and v.

(2) Calculation of Corresponding Point

The standard normalization unit 13 determines (x, y) calculated by equations given below as a corresponding point with respect to coordinate values (u, v) of the pixel of interest.

$$x=u+x_{min}, y=v+y_{min}$$

(3) Calculation of Pixel Value

The standard normalization unit 13 assumes the pixel value of a pixel (x, y) of the captured image as the pixel value of the pixel of interest (u, v) of the normalized image.

(4) Movement of Pixel of Interest

The standard normalization unit 13 moves the pixel of interest to the right by one. If the pixel of interest is positioned at the right end, the standard normalization unit 13 moves the pixel of interest to the left end in the next lower row. If the pixel of interest is positioned at the lower right, the standard normalization unit 13 finishes processing. The standard normalization unit 13 calculates a corresponding point again.

Figure 7A:
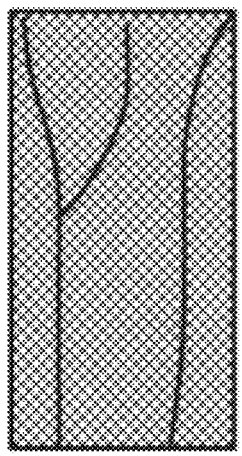
FIG. 7A and FIG. 7B are illustrations representing a normalized image and an extracted vein image.

The aforementioned approach is a scheme in which a captured image is cut out in a circumscription rectangle of feature points of the outline of a hand. FIG. 7A illustrates an example of a normalized image for FIG. 6B. The image size is 30×60 according to the aforementioned approach. Note that, with the aforementioned approach, there is a possibility that the size of a normalized image generated varies for every captured image. To address this, if a method for calculating corresponding points is modified as in equations mentioned below, the sizes of normalized images may be made uniform so as to be a certain value, $w_{out} \times h_{out}$. In this case, there is no guarantee that the calculated (x, y) will be non-negative integers, and therefore, the pixel value of a pixel having the closest coordinate values, for example, may be used for calculation of a pixel value. Additionally, the pixel value may be determined by performing an interpolation among pixel values of a plurality of pixels in the vicinity.

$$x = \frac{x_{max} - x_{min}}{w_{out} - 1} u + x_{min}$$

$$y = \frac{y_{max} - y_{min}}{h_{out} - 1} v + y_{min}$$

As a more general method, a method in which the outline of a hand is represented by a convex quadrangle and it is normalized into a rectangle may be considered. One approach for determining a point (x, y) of a captured image corresponding to a pixel (u, v) of a normalized image will be illustrated. If a correspondence is determined, a normalized image may be created as in the aforementioned approach. The four vertices of a convex quadrangle are assumed to be $(x_{11}, y_{11})$, $(x_{12}, y_{12})$, $(x_{22}, y_{22})$, and $(x_{21}, y_{21})$. A method for calculating corresponding points are expressed as equations given below.

$$x = x_{11} + \frac{x_{12} - x_{11}}{w_{out} - 1} u + \frac{x_{21} - x_{11}}{h_{out} - 1} v + \frac{x_{22} - x_{12} - x_{21} + x_{11}}{(w_{out} - 1)(h_{out} - 1)} uv$$

$$y = y_{11} + \frac{y_{12} - y_{11}}{w_{out} - 1} u + \frac{y_{21} - y_{11}}{h_{out} - 1} v + \frac{y_{22} - y_{12} - y_{21} + y_{11}}{(w_{out} - 1)(h_{out} - 1)} uv$$

Various approaches besides the methods disclosed above may be considered. A point to be emphasized is that, with a method in which normalization is performed only based on the outline of a hand, it is impossible to follow a deformation inside the hand that does not appear in the hand outline.

Subsequently, prior to describing the image transformation unit 14, a general framework of association between the outline of a hand and the inside of the hand is first described. A specific example thereof will be described later. The shape of a hand outline is represented by vector s. Here, elements of s include coordinate values of feature points of the hand outline and values (for example, the minimum value and the maximum value) of a function thereof. In contrast, regarding the inside of the hand, a vector z indicating a position in the captured image is used. In some cases, z is expressed in components such that z=(x, y). The coordinate values of a pixel in the normalized image corresponding to z are assumed to be (u, v). In this application, the inside of a hand is estimated from the outline of the hand using training data. Thus, it is expected that more suitable normalization may be performed. For this purpose, first, a function f that returns a point z inside the hand to the hand outline s is prepared. While f includes an unknown parameter θ, the other parameters are assumed as known. θ is called a transformation coefficient. A point z inside the hand is estimated by z=f(s; θ). Note that the transformation coefficient θ has a value varying with the pixel (u, v) of the normalized image. In the case where it is emphasized, θ is represented by $\theta_{u, v}$.

Next, image transformation in which normalization is performed using a transformation coefficient will be described. One approach will be illustrated below. An image for storing a result of normalization is prepared.

(1) Preparation

The image transformation unit 14 sets a pixel of interest at the upper left of a normalized image. The image transformation unit 14 assumes variables representing coordinate values of the pixel of interest to be u and v.

(2) Calculation of Corresponding Point

The image transformation unit 14 determines z=(x, y), which is determined by z=f (s; $\theta_{u, v}$), with respect to coordinate values (u, v) of the pixel of interest.

(3) Calculation of Pixel Value

The image transformation unit 14 assumes the pixel value of a pixel of the captured image closest to (x, y) as the pixel value of the pixel of interest (u, v) of the normalized image.

(4) Movement of Pixel of Interest

The image transformation unit 14 moves the pixel of interest to the right by one. If the pixel of interest is positioned at the right end, the image transformation unit 14 moves the pixel of interest to the left end in the next lower row. If the pixel of interest is positioned at the lower right, the image transformation unit 14 finishes processing. The image transformation unit 14 calculates a corresponding point again.

In the aforementioned approach, the transformation coefficient θ is determined for every pixel (u, v). In order to reduce the amount of processing during calculation of transformation coefficients and the storage capacity, it is conceivable to limit pixels for which transformation coefficients are determined only to some of pixels. In this case, the image transformation unit 14 performs normalization through an interpolation of the transformation coefficient θ or the corresponding point z, for example. An example of a method for calculating corresponding points in the aforementioned processing will be illustrated.

(1) Preparation

The image transformation unit 14 prepares a variable a for storing a vector and a variable k representing a counter, and substitutes 0 for both the variables.

(2) Search

The image transformation unit 14 lists one pixel (u', v') in the vicinity for which a transformation coefficient has been calculated, for the coordinate values (u, v) of the pixel of interest. If such a pixel does not exit, an average calculation is performed.

(3) Calculation of Corresponding Point

The image transformation unit 14 calculates z'=f(s; $\theta_{u', v'}$).

(4) Calculation of Total

The image transformation unit 14 adds z' to a. The image transformation unit 14 increments the value of k by 1.

(5) Repetition

The image transformation unit 14 performs a search operation again.

(6) Average Calculation

The image transformation unit 14 determines a final corresponding point by z=a/k. More generally, a method in which an interpolation is performed in consideration of the distance to a pixel for which the transformation coefficient has been obtained may be considered.

Subsequently, details of the extraction unit 20 will be described. One approach for extraction of a vein image by the extraction unit 20 will be illustrated. Since a vein is represented as a pattern darker than the background or a hand region in an image, the vein may be extracted, for example, through binarization as mentioned below. An output image for storing a vein image is prepared.

(1) Preparation

The extraction unit 20 sets a pixel of interest at the upper left of an image.

(2) Binarization

If, regarding the normalized image, the pixel value of the pixel of interest is larger than a prescribed threshold 2, the extraction unit 20 determines that the pixel of interest is an item other than a vein and writes a pixel value of 0 to the pixel of interest of the output image. Otherwise, the extraction unit 20 determines that the pixel of interest is a vein, and writes a pixel value of 1 to the pixel of interest of the output image.

(3) Movement of Pixel of Interest

The extraction unit 20 moves the pixel of interest to the right by one. If the pixel of interest is positioned at the right end, the extraction unit 20 moves the pixel of interest to the left end in the next lower row. If the pixel of interest is positioned at the lower right, the extraction unit 20 finishes processing.

(4) Repetition

The extraction unit 20 repeats the aforementioned processing.

Figure 7B:
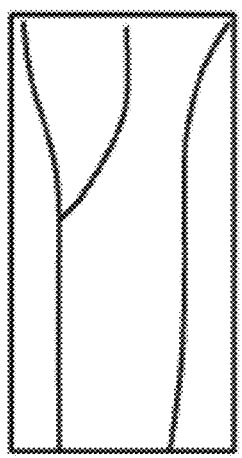

The threshold 2 is made smaller than the threshold 1 used in the detection of a hand outline. A value larger than the pixel value of an average vein image may be set for the threshold 2. In the case where pixel values range from 0 to 255, a value of 60 may be used, for example. FIG. 7B is an illustration representing an example of extraction for a normalized image. In FIG. 7B, pixels of a pixel value of 1 are rendered black.

Note that, in this extraction approach, a vein image is represented as a binary image. In addition, a method in which a feature amount is calculated from an image may also be considered in order to reduce the storage capacity and to speed up the comparing process. As the feature amount, for example, coordinate values of points forming a vein image, and coordinate values of feature points such as peaks, branch points, and end points of broken lines when a vein image is thinned into lines and approximates broken lines may be considered.

Subsequently, details of the alignment unit 30 that performs alignment of two vein images will be described. One approach for performing alignment of two vein images will be illustrated below. Here, the case where a vein image is represented as a binary image is described. The images are called a vein image 1 and a vein image 2. A two-dimensional array in which corresponding points are to be recorded is prepared.

(1) Initialization

The alignment unit 30 sets a pixel of interest at the upper left of the vein image 1.

(2) Setting of Search Initial Position

The alignment unit 30 sets a search position to be the same as the position of the pixel of interest of the vein image 2.

(3) Calculation of Degree of Comparing

The alignment unit 30 sets a rectangle region that has a predetermined size and is centered around the pixel of interest and a rectangle region that has the same size as the rectangle region size and is centered around the search position, as the vein image 1 and the vein image 2, respectively, and calculates the degree of comparing between vein images inside the respective regions. The degree of comparing uses a value obtained in such a way that the number of pixels where the pixels and their corresponding pixels both have a pixel value of 1 is divided by the number of pixels where either the pixels or their corresponding pixels have a pixel value of 1. When a rectangle extrudes from an image in such a manner that a pixel is outside the image, the pixel value of the pixel is regarded as 0.

(4) Calculation of Maximum

The alignment unit 30 moves the search position within a predetermined range, determines a search position that gives a maximum degree of comparing vein images, among the positions, as a corresponding point of the pixel of interest, and records its coordinate values in the two-dimensional array.

(5) Repetition

The alignment unit 30 moves the pixel of interest to the right by one. If the pixel of interest is positioned at the right end, the alignment unit 30 moves the pixel of interest to the left end in the next lower row. If it is impossible to further move the pixel of interest, the alignment unit 30 finishes processing.

In the aforementioned approach, the coordinate values of a pixel of the vein image 2 to which a pixel of the vein image 1 corresponds are stored in the two-dimensional array. Note that if a vein image is sparse, there is a possibility that a pixel for which it is impossible to calculate the degree of comparing will be included. In that case, corresponding points are set for all the pixels using a method, such as an interpolation of corresponding points in pixels for which the degree of comparing has been calculated. As another alignment approach, there is a method in which mapping for performing alignment is defined, and unknown parameters included therein are estimated. As mapping, parallel translation as in equations given below, for example, may be used.

$$x'=x+a_1$$

$$y'=y+a_2$$

For example, an unknown parameter may be estimated as follows.

(1) Initialization

The alignment unit 30 prepares a variable for maintaining a parameter representing parallel translation, an image that is temporarily used, and a variable for maintaining the maximum degree of comparing. The parameter representing parallel translation is set at the upper left (minimum value) in a predetermined range.

(2) Generation of Transformed Image

The alignment unit 30 calculates (x', y') for each pixel (x, y) using the equations of parallel translation, and uses the value of that pixel of the vein image 2 as the value of the pixel (x, y) of an image temporarily used.

(3) Calculation of Degree of Comparing

The alignment unit 30 calculates the degree of comparing between the vein image 1 and the image temporarily used. As the degree of comparing between both, a value obtained in such a way that the number of pixels where the pixels and their corresponding pixels both have a pixel value of 1 is divided by the number of pixels where either the pixels or their corresponding pixels have a pixel value of 1 may be used.

(4) Calculation of Maximum

If the degree of comparing calculated this time is larger than the maximum degree of comparing, the alignment unit 30 replaces the maximum degree of comparing with the degree of comparing calculated this time, and records the current parallel translation parameter.

(5) Repetition

The alignment unit 30 moves (increases) the parameter representing parallel translation to the right by one. If the parameter is positioned at the right end of the predetermined range, the alignment unit 30 moves the parameter to the left end in the next lower row. If it is impossible to further move the parameter, the alignment unit 30 finishes processing.

Examples of more general mapping include a similar transformation and an affine transformation. For these transformations, a parameter may be estimated in a way similar to that mentioned above. Additionally, corresponding points are determined first and, based on them, a parameter may be estimated. In this case, a parameter may be determined with the basis for evaluation, for example, using a least-squares method such that errors with respect to the corresponding points are small.

Subsequently, an example of data the storage unit 203 stores will be described. The storage unit 203 stores vein images and transformation coefficients in association with the users' IDs, as illustrated in Table 2. Vein images are stored in such a way that they are transformed into numeric character strings according to a certain rule. In the case where a vein image is represented as an image, a numeric character string in which pixel values are arranged in a single line, for example, may be used.

TABLE 2

| User ID | Vein image | Transformation factor |
|---|---|---|
| 0001 | 0, 1, 0, 0, 1, 1, 0, 1, 1, ... | 0.1, 0.2, ... |
| 0002 | 0, 0, 0, 1, 1, 1, 1, 0, 0, ... | 0.2, −0.1, ... |
| . | . | . |
| . | . | . |
| . | . | . |

Subsequently, details of the comparing unit 60 will be described. When a vein image is represented as a binary image, the degree of similarity between vein images may be calculated, for example, by a method mentioned below.

(1) Initialization

The comparing unit 60 sets a pixel of interest at the upper left of an image. The comparing unit 60 prepares a variable (counter) for maintaining the number of pixels that compare, and a variable for maintaining the number of pixels that constitute a vein image, and initializes each of the variables to 0.

(2) Comparison of Pixel Values

The comparing unit 60 acquires the pixel value of each of two images, in the pixel of interest, and compares the values. If both the pixel values represent vein images, the comparing units 60 increments the value of the a counter for the number of pieces of comparing by one. If either of the pixel values represents a vein image, the comparing unit 60 increments the value of the counter for constitution of a vein image by one.

(3) Movement of Pixel of Interest

The comparing unit 60 moves the pixel of interest to the right by one. If the pixel of interest is positioned at the right end, the comparing unit 60 moves the pixel of interest to the left end in the next lower row. If the pixel of interest is positioned at the lower right, the comparing unit 60 finishes processing.

(4) Repetition

The comparing unit 60 compares pixel values again.

(5) Output of Degree of Similarity

The comparing unit 60 sets a value obtained by dividing the value of the counter for the number of pieces of comparing by the value of the counter for constitution of a vein image, as the degree of similarity.

In this embodiment, alignment is performed based on extracted biometric information, and the amount related to coordinates is normalized based on a result of alignment, thereby enabling the degree of similarity between vein images for the same person to be increased without a special device and alignment in the comparing process. With the aforementioned method, for example, even if pixel values of images are rearranged in a random fashion, the same degree of similarity is obtained, for example, if the rearrangement is common to the two images. In this way, according to this embodiment, it becomes possible to perform the comparing process for encrypted biometric information remaining as is.

Subsequently, details of the determination unit 70 will be described. The determination unit 70 compares the degree of similarity calculated by the comparing unit 60 with a threshold Th determined in advance, and if the degree of similarity is larger than the threshold Th, the determination unit 70 identifies the user as the registered person him- or herself. One example of how to determine the threshold Th is as follows. Biometric information of a large number of people is collected for evaluation, and false acceptance rates (the probability that comparing data of another person is incorrectly identified as the user him- or herself) are calculated for these pieces of biometric information and various thresholds. A threshold at which the false acceptance rate is one-ten-thousandth (accuracy the same as a four-digit password) is found out, and this threshold may be set as Th.

Subsequently, details of the transformation calculation unit 40 will be described. If a learning scheme based on training data of the related art is simply applied to this embodiment, a pair of the outline s and the point z inside a hand has to be provided as training data in order to calculate a transformation coefficient. However, the structure of a vein image is not clearly seen, and therefore the point z inside the hand is not uniquely determined and it is impossible to create training data under the current condition.

With the alignment unit 30, points corresponding to each other between two vein images are obtained. Accordingly, solely for 1:1 authentication, the coordinates of a first registered image, for example, are used as the coordinates of a normalized image, thereby enabling registered data to be used as training data. In particular, the following is performed. There are n registered images, and the outline of j-th (j=1, ... n) registered image is $s_j$ and corresponding points of a vein image are $z_{j,k}$ ($x_{j,k}$, $y_{j,k}$) (k=1, ... K). An index of a corresponding point is represented by k. A transformation parameter θ corresponding to a pixel ($x_{1,k}$, $y_{1,k}$) of a normalized image may be determined, for example, by minimizing the evaluation function of the formula given below. However, it is preferable that the transformation parameter θ be chosen so that the constraint that the estimated error of the first registered image is 0, that is, f ($s_1$; θ)=$z_{1,k}$ is satisfied. Here, ||z|| represents the norm of a vector z, and may be determined, for example, as $||z||=\sqrt{(x^2+y^2)}$, when z=(x, y).

$$J(\theta) = \sum_{j=2}^{n} \|f(s_j; \theta) - z_{j,k}\|^2$$

Figure 8:
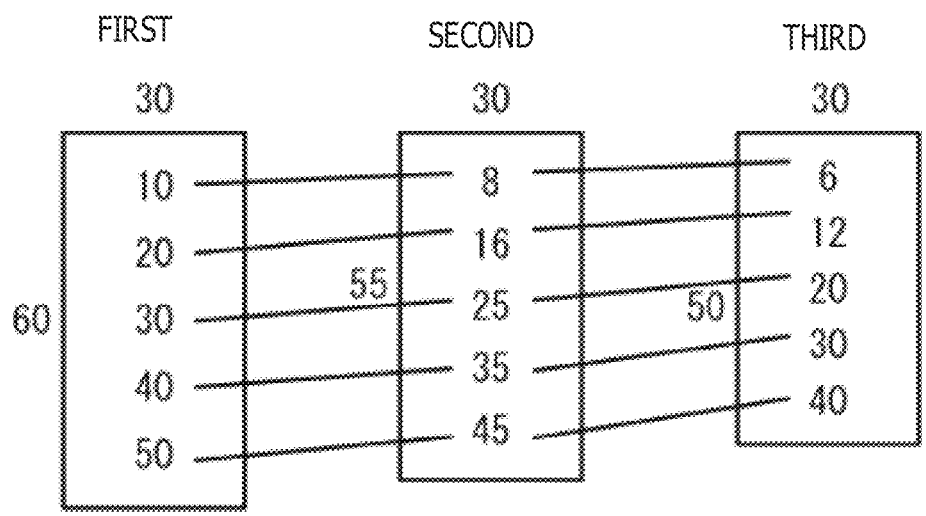
FIG. 8 is a result of alignment of vein images extracted from three images.

The aforementioned method will be described below using a specific example. An example in which three images are captured, and first two of them are used as registered data and training data is adopted. FIG. 8 exemplifies a result of alignment of vein images extracted from three images. While the same values are accurately associated with all the three images in the x-direction, the vein images shrink un-uniformly as their heights decrease, in the y-direction. Such a phenomenon occurs, for example, when a finger side of a palm is slightly bent. In the related art technology in which the position and the orientation of a vein image are simply aligned based on the outline, it is impossible to handle such an un-uniform change.

As specific elements for representing the outline s, the size (width and height) of a standard normalized image is used. It is assumed that the width of the j-th (j=1, 2, 3) image is $w_j$, and the height is $h_j$. Here, $w_j$=30, $h_1$=60, $h_2$=55, and $h_3$=50. A corresponding point of a vein image is ($x_{j,k}$, $Y_{j,k}$) (k=1, ... 5). Note that, in this embodiment, for the ease of understanding, consideration is given to the coordinate system of a standard normalized image, not to the coordinate system of a captured image.

For a pixel ($x_{1,k}$, $y_{1,k}$) of the normalized image, since identity mapping, for example, may result in estimation with no error in the x-direction, estimation is made only for the y-direction hereinafter. The transformation coefficient θ is (a, b), and a linear equation y=ah+b is used as the function f. In the case of the aforementioned method, estimation of the transformation coefficients a, b results in the following optimization problem. $y_{1,k}=ah_1+b$, $(ah_2+b-y_{2,k})^2 \rightarrow$ minimize.

The solution to the above expression is represented as follows. $a=(y_{2,k}-y_{1,k})/(h_2-h_1)$ $b=y_{1,k}-ah_1$ In the aforementioned specific example, the transformation coefficient a, b is determined as illustrated in Table 3.

TABLE 3

| Y-coordinate value of normalized pixel | a | b |
|---|---|---|
| 10 | 0.4 | −14 |
| 20 | 0.8 | −28 |
| 30 | 1 | −30 |
| 40 | 1 | −20 |
| 50 | 1 | −10 |

If the third vein image is normalized using a transformation coefficient in Table 3, a difference (normalization error) between the coordinate value estimated from the outline and the coordinate value of the actual corresponding point is calculated as listed in Table 4.

TABLE 4

| Y-coordinate value of normalized pixel | Estimated y-coordinate value | Actual y-coordinate value | Normalization error |
|---|---|---|---|
| 10 | 6 | 6 | 0 |
| 20 | 12 | 12 | 0 |
| 30 | 20 | 20 | 0 |
| 40 | 30 | 30 | 0 |
| 50 | 40 | 40 | 0 |

If the third vein image is used as comparing data, since the normalization error between the comparing data and the registered data is zero, it is expected to obtain a high degree of similarity between the comparing data and the registered data. Note that while, in the aforementioned example, the transformation coefficient is represented in the coordinate system of the standard normalized image for the sake of simplicity, the transformation coefficient may be represented in the coordinate system of a captured image when normalization is actually performed. Transformation of a coordinate system may be easily performed by coordinate transformation that is used for calculation of a corresponding point performed in standard normalization.

Second Embodiment

Figure 9:
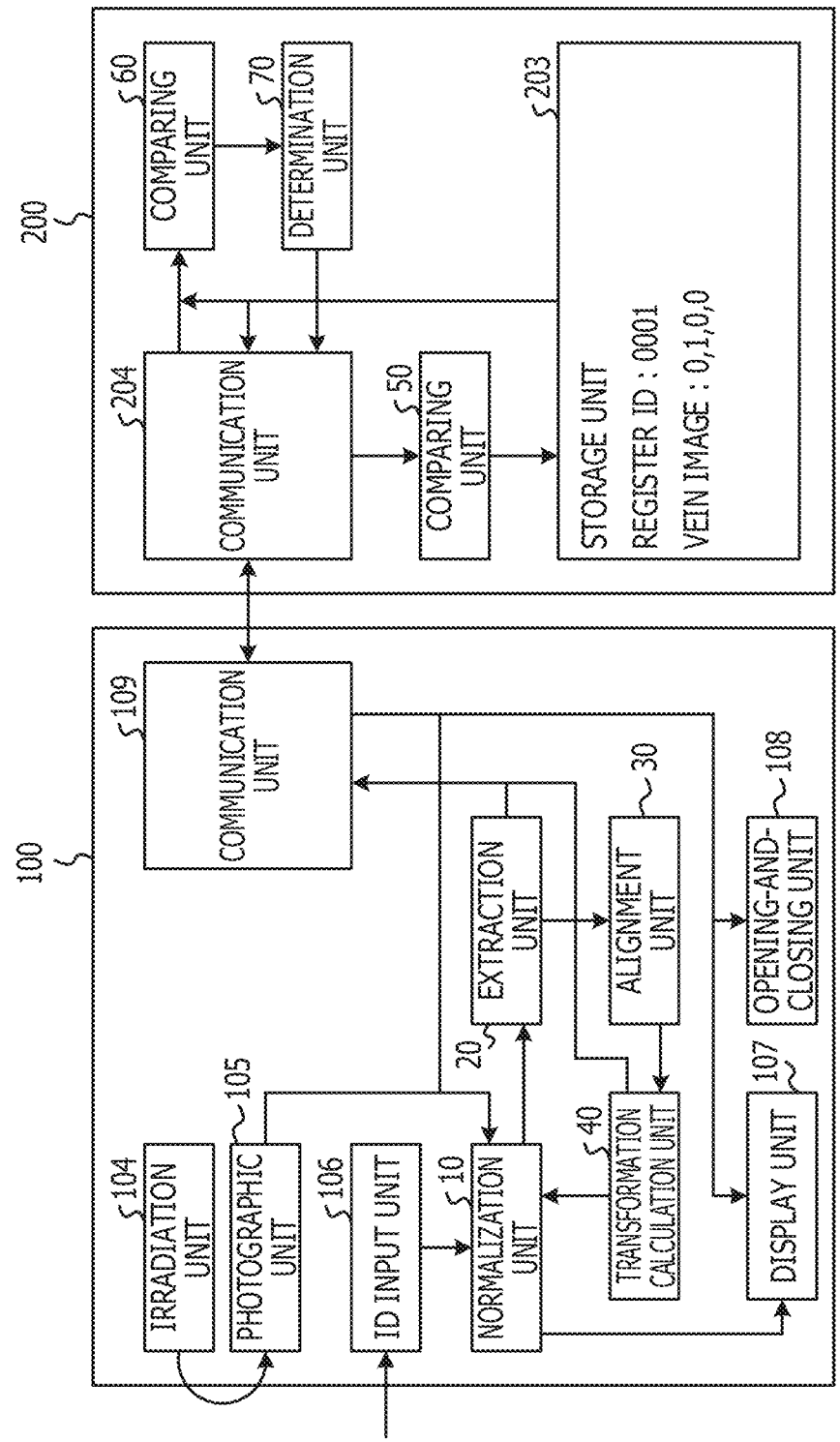
FIG. 9 is a functional block diagram of a biometric information authentication device according to a second embodiment.

In a second embodiment, a biometric information authentication device 300a that performs 1:N authentication, which does not use ID input at the time of authentication, will be described. As a hardware configuration of the biometric information authentication device 300a, a hardware configuration similar to that of the first embodiment may be used. FIG. 9 is a functional block diagram of the biometric information authentication device 300a. The biometric information authentication device 300a performs processing different from that of the biometric information authentication device 300. In addition, the storage unit 203 does not store a transformation coefficient.

Figure 10:
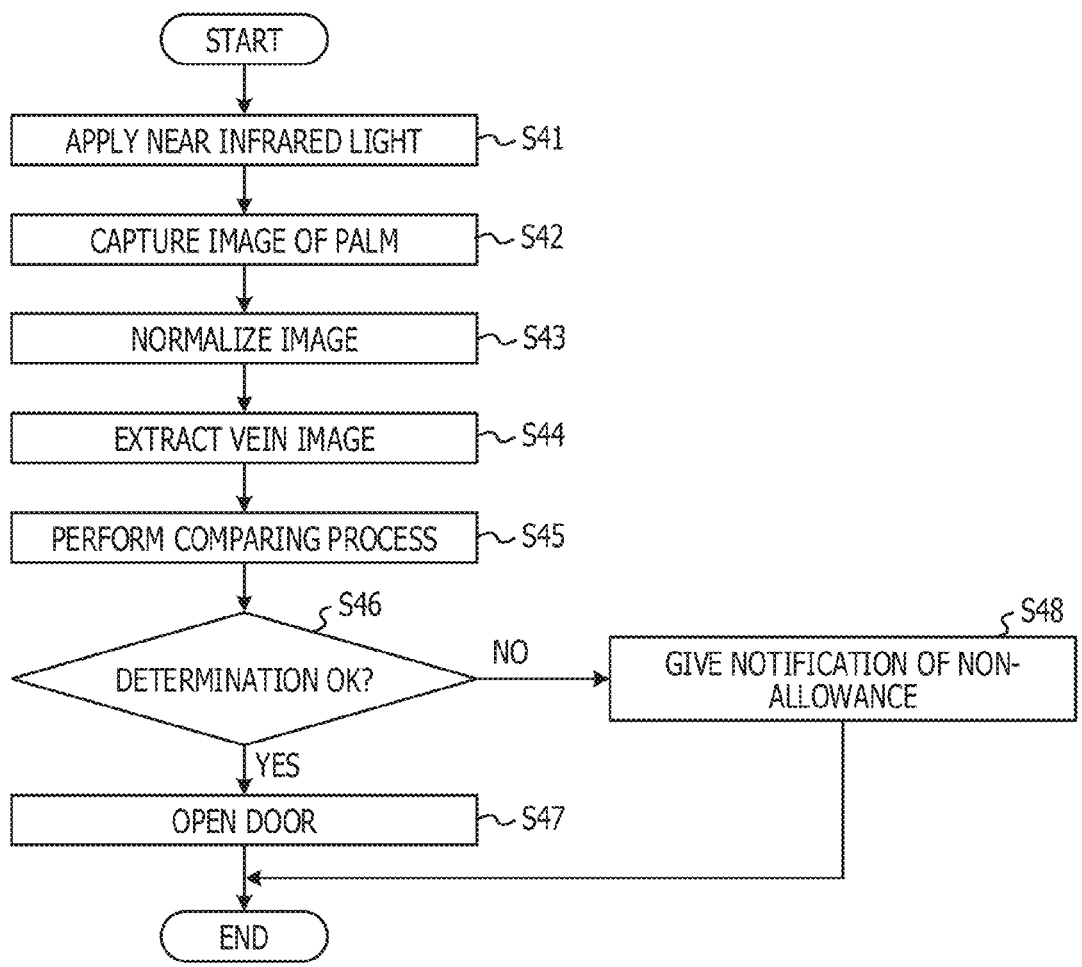
FIG. 10 is a flowchart illustrating an outline of processing performed by the biometric information authentication device at the time of authentication.

FIG. 10 is a flowchart illustrating an outline of processing performed by the biometric information authentication device 300a at the time of authentication. With reference to FIG. 10, the processing of steps S3, S4, S6, and S7 of FIG. 4 is performed as processing of step S41 to step S44. Next, the comparing unit 60 calculates the degrees of similarity between extracted vein images and vein images of all the IDs, in order, as the comparing process (step S45). The determination unit 70 determines whether there is a register for whom the calculated degree of similarity is greater than a given threshold (step S46). If "Yes" is the determination in step S46, the opening-and-closing unit 108 opens an automatic door (step S47). At the time of opening of the automatic door, the display unit 107 may notify the user of an authentication result indicating that access to the room is allowed. If "No" is the determination in step S46, the display unit 107 notifies the user that access to the room is not allowed (step S48).

Figure 11:
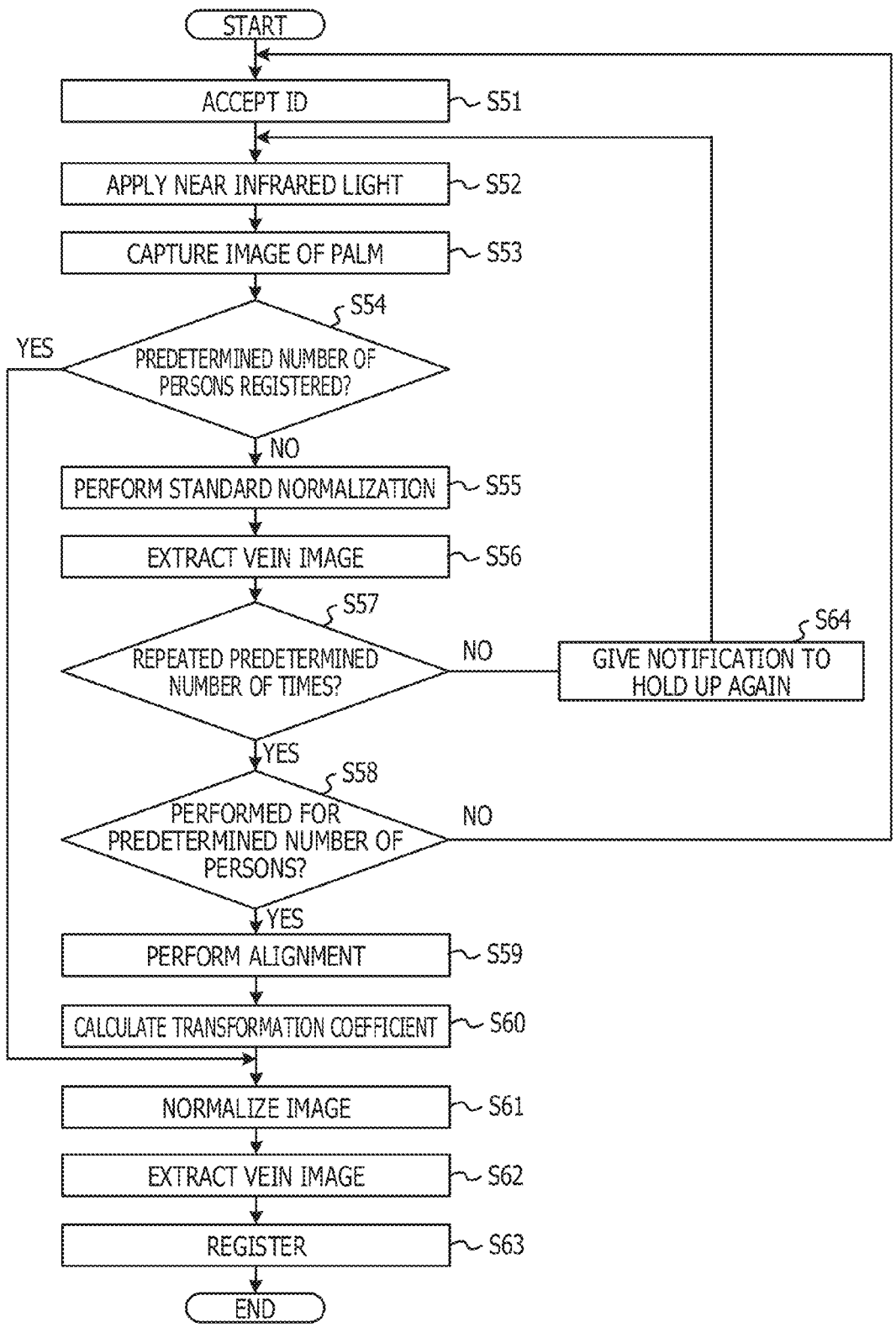
FIG. 11 is a flowchart illustrating an outline of processing performed by the biometric information authentication device at the time of registration of biometric information.

FIG. 11 is a flowchart illustrating an outline of processing performed by the biometric information authentication device 300a at the time of registration of biometric information. With reference to FIG. 11, the processing of step S21 to step 23 of FIG. 5 is performed as processing of step S51 to step S53. Next, the normalization unit 10 determines whether a predetermined number of persons have been registered (step S54). If "No" is the determination in step S54, the processing of step S24 to step 26 of FIG. 5 is performed as processing of step S55 to step S57.

Next, the alignment unit 30 determines whether standard normalization and extraction of a vein image have been performed for the predetermined number of persons (step S58). If "Yes" is the determination in step S58, the alignment unit 30 performs alignment among the stored vein images (step S59). The transformation calculation unit 40 calculates a transformation coefficient based on results of alignment and detected feature points (step S60). The normalization unit 10 again normalizes the stored, captured image using the calculated transformation coefficient (step S61). The extraction unit 20 extracts a vein image from the normalized image (step S62). Next, the registration unit 50 stores the vein image in association with an ID in the storage unit 203 (step S63). At this time, all the obtained vein images may be stored in the storage unit 203. Alternatively, a vein image selected based on a predetermined standard (for example, a first vein image) may be stored in the storage unit 203. If "No" is the determination in step S57, the display unit 107 displays an instruction given to the user to hold up again (step S64). Thereafter, the processing of step S52 to step S57 is repeated. If "Yes" is the determination in step S54, calculation of a transformation coefficient is not performed, and the processing of step S61 to step S63 is performed.

In the case where the biometric information authentication device 300 according to the first embodiment is applied to 1:N authentication, the following three points are problems.

(1) It is impossible to switch the transformation coefficient for every ID.

(2) It is impossible to align vein images having different IDs.

(3) It is impossible to determine a coordinate system of a normalized image.

Regarding (1), the problem arises from the fact that since an ID is not input at the time of authentication, it is impossible to read a transformation coefficient from the storage unit 203. Regarding (2), the problem arises from the fact that since vein images of different IDs are completely different, it is originally impossible to define points that are to correspond to each other. Regarding (3), the problem arises from the fact that it is considered that determining a coordinate system of a normalized image as a first captured image of a specific ID is unnatural and unsuitable. Since these problems exist, it is difficult to simply apply the biometric information processing unit 300 according to the first embodiment to 1:N authentication.

To address this, in this embodiment, the aforementioned problems are solved by a method mentioned below.

(1) This embodiment performs commonality of a transformation coefficient among all the ID.

(2) This embodiment does not perform alignment among vein images of different IDs, and uses a correspondence relationship determined by standard normalization based on a hand outline.

(3) This embodiment determines the coordinate system of a normalized image by standard normalization based on a hand outline.

Subsequently, details of the transformation calculation unit 40 according to this embodiment will be described. For transformation calculation, n registered images are assumed to have been input for each of m IDs. Hereinafter, a method for creating training data from them and calculating a transformation coefficient will be explained in detail. The coordinate value of a pixel of a normalized image is (u, v). It is assumed that j-th (j=1, . . . n) data of an i-th (i=1, . . . m) ID is represented as (i, j), and the outline is $s_{i,j}$. The meaning of $s_{i,j}$ is similar to that of the first embodiment, and is a vector including coordinate values of feature points of a hand outline and values (for example, the minimum value and the maximum value) of the function thereof.

The result of alignment of vein images within the same ID is represented by mapping $T_{i,j}$. Here, $T_{i,j}$ represents that a point of a j-th image corresponding to a point z of a first image of an i-th ID is $T_{i,j}(z)$. In the case of j=1, identity mapping is assumed. How to determine the mapping $T_{i,j}$ is similar to that in the processing performed by the alignment unit 30 in the first embodiment. In data (i, j), the vector of a point corresponding to a pixel (u, v) of a normalized image determined by standard normalization processing is $p_{i,j}$.

In this embodiment, the transformation calculation unit 40 determines the above amounts as training data, and calculates a transformation coefficient from the amounts. As the gentlest method for calculating a transformation coefficient, it may be considered that alignment with a point determined by standard normalization processing is performed for the first image of each ID, and alignment with a point corresponding to the result is performed for the second or more images. In particular, for example, a transformation coefficient θ that minimizes an evaluation function $J_1$ given below is used. Here, f is a known function that estimates a point z inside a hand, for the outline s and the transformation coefficient θ, by z=f (s; θ).

$$J_1(\theta) = \sum_{i=1}^{m}\left[\|f(s_{i,1};\theta) - p_{i,1}\|^2 + \sum_{j=2}^{n}\|f(s_{i,j};\theta) - T_{i,j}(p_{i,1})\|^2\right]$$

However, the aforementioned calculation method has the problem that the method will not minimize normalization errors for the same ID. The normalization error as used herein refers to a difference between a coordinate value estimated from the outline and a corresponding point. In order to raise the degree of similarity between data of the same person, it is desirable that such a transformation coefficient as to minimize the normalization errors for the same ID be determined. From this viewpoint, it may be considered that a transformation coefficient is suited so as to minimize normalization errors for the second or more images, for example. However, the correspondence between the outline and the inside of a hand becomes indefinite only by this way, and therefore it is conceivable to give, for example, the constraint that the image is not so distant from a point determined by standard normalization processing, to the first image of each ID. In particular, for example, a transformation coefficient given below that minimizes an evaluation function $J_2$ is used.

$$J_2(\theta) = \sum_{i=1}^{m}\left[\sum_{j=2}^{n}\|f(s_{i,1};\theta) - T_{i,j}(f(s_{i,1};\theta))\|^2 + \gamma\|f(s_{i,1};\theta) - p_{i,1}\|^2\right]$$

Here, γ is a small positive number, and is, for example, 0.01. The first term of the evaluation function represents a normalization error with respect to the first image, and the second term represents displacement from a point determined by standard normalization processing. For the second term, a method in which displacement is taken into consideration for all the data as in a formula given below may be considered.

$$\sum_{j=1}^{n}\gamma\|f(s_{i,j};\theta) - p_{i,j}\|^2$$

Figure 12A:
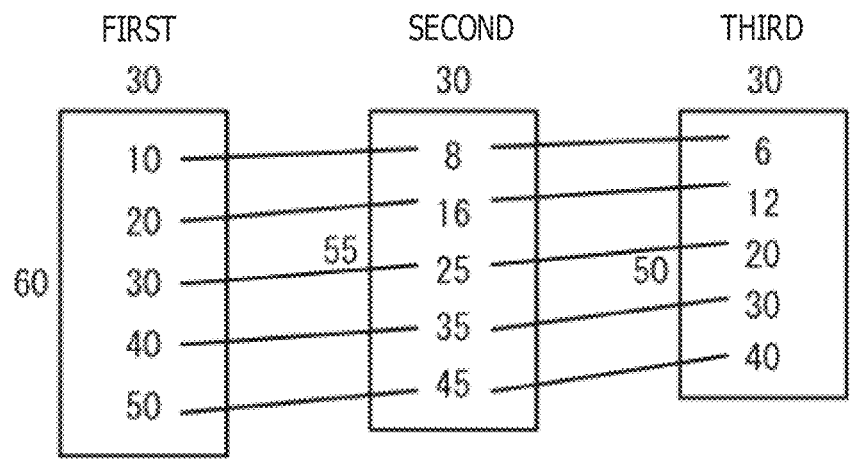
FIG. 12A and FIG. 12B illustrate results of alignment of vein images extracted from three images.
Figure 12B:
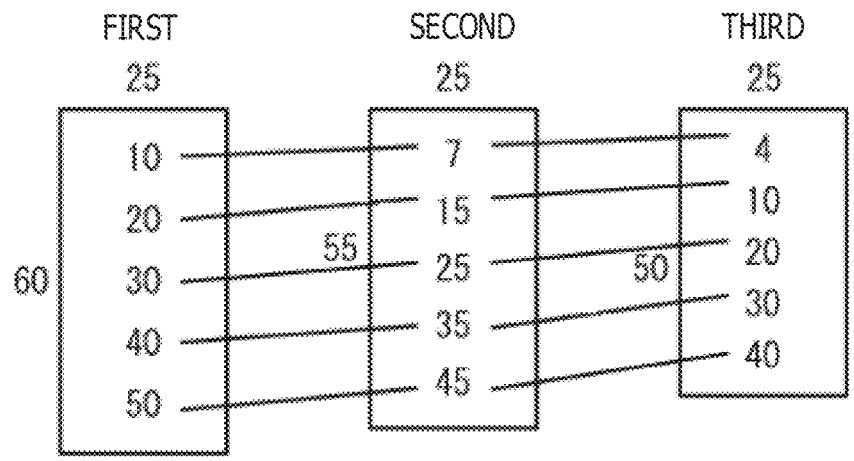

The aforementioned method will be described below using a specific example. An example in which, for each of two IDs 0001 and 0002, three images are captured, and first two of them are used as registered data and as training data is adopted. FIG. 12A and FIG. 12B illustrate results of alignment of vein images extracted from three images. While the same values are accurately associated with all the three images in the x-direction, the vein images shrink un-uniformly as their heights decrease, in the y-direction. Such a phenomenon occurs, for example, when a finger side of a palm is slightly bent. In the related art technology in which the position and the orientation of a vein image are simply aligned based on the outline, it is impossible to handle such an un-uniform change. Furthermore, un-uniformity differs for every ID, and the non-uniformity of the ID 0002 is higher.

As specific elements for representing the outline s, the size (width and height) of a standard normalized image is used. The width of a j-th (j=1, 2, 3) image of an i-th ID is $w_{i,j}$, and the height is $h_{i,j}$. Note that, in this embodiment, for the ease of understanding, consideration is given to the coordinate system of a standard normalized image, not to the coordinate system of a captured image. It is assumed that normalized images are made uniform so as to be a certain value $w_{out} \times h_{out}$. Here, $w_{out}$=30 and $h_{out}$=60. For a pixel (u, v) of a normalized image, since estimation with no error may be achieved in the x-direction such that, for example, x=u($w_{i,j}$−1)/($w_{out}$−1), estimation is made only for the y-direction hereinafter. The transformation coefficient θ is (a, b, c), and a linear equation y=aw+bh+c may be used as the function f. For example, if v=10, the evaluation factor $J_1$ described above is expressed by the following formula.

$$J_1(a,b,c) = (30a+60b+c-10)^2 + (30a+55b+c-8)^2 + (25a+60b+c-10)^2 + (25a+55b+c-7)^2$$

By solving a simultaneous linear equation obtained in such a way that $J_1$ is partially differentiated by each parameter and is set to 0, it is possible to easily determine a, b, and c that minimize $J_1$. For v in other cases, transformation coefficients may be determined similarly. Table 5 illustrates results in the cases where v=10 and v=20.

TABLE 5

| v | a | b | c |
|---|---|---|---|
| 10 | 0.1 | 0.5 | −22.75 |
| 20 | 0.1 | 0.9 | −36.75 |

Table 6 illustrates results of calculation of normalization errors (rounding off the number to two decimal places). In calculation of a normalization error, mapping $T_{i,j}$ has to be calculated for an arbitrary point. Here, identity mapping is used for x, and broken lines obtained through a linear interpolation of correspondences between given five points and points at ends of an image are used for y.

TABLE 6

| v | Second of ID 0001 | Third of ID 0001 | Second of ID 0002 | Third of ID 0001 |
|---|---|---|---|---|
| 10 | −0.45 | −0.90 | 0.42 | 0.85 |
| 20 | −0.47 | −0.95 | 0.45 | 0.90 |

In contrast, an example of calculation in the case where the evaluation function $J_2$ is used will be illustrated below. Minimization of $J_2$ may be performed, for example, by a method in which the transformation coefficients a, b and c are selected a plurality of times in a random fashion and the values of $J_2$ are calculated, and then a, b, and c that give the minimum value among the calculated values are selected. It is assumed that $\gamma=0.01$. Table 7 illustrates results for v=10 and v=20 (rounding off the number to two decimal places).

TABLE 7

| v | a | b | c |
|---|---|---|---|
| 10 | 0.67 | 0.47 | −36.62 |
| 20 | 0.86 | 0.86 | −55.74 |

Table 8 illustrates results of calculation of normalization errors (rounding off the number to two decimal places). It is found that the normalization errors decrease compared to the case where $J_1$ is used. From this, it is expected that the degree of similarity between data of the same person is higher in the case where $J_2$ is used.

TABLE 8

| v | Second of ID 0001 | Third of ID 0001 | Second of ID 0002 | Third of ID 0001 |
|---|---|---|---|---|
| 10 | −0.07 | −0.13 | 0.07 | 0.14 |
| 20 | −0.14 | −0.29 | 0.14 | 0.28 |

According to this embodiment, alignment is performed based on extracted biometric information, and the amount related to coordinates is normalized based on a result of alignment, thereby enabling the degree of similarity between registered data and comparing data for the same person to be raised without alignment in the comparing process. In addition, commonality of a transformation coefficient among all the IDs is performed, alignment is not performed among vein images of different IDs, and a correspondence relationship determined by standard normalization is used, thereby enabling the degree of similarity between registered data and comparing data for the same person to be raised in 1:N authentication.

Third Embodiment

Figure 13:
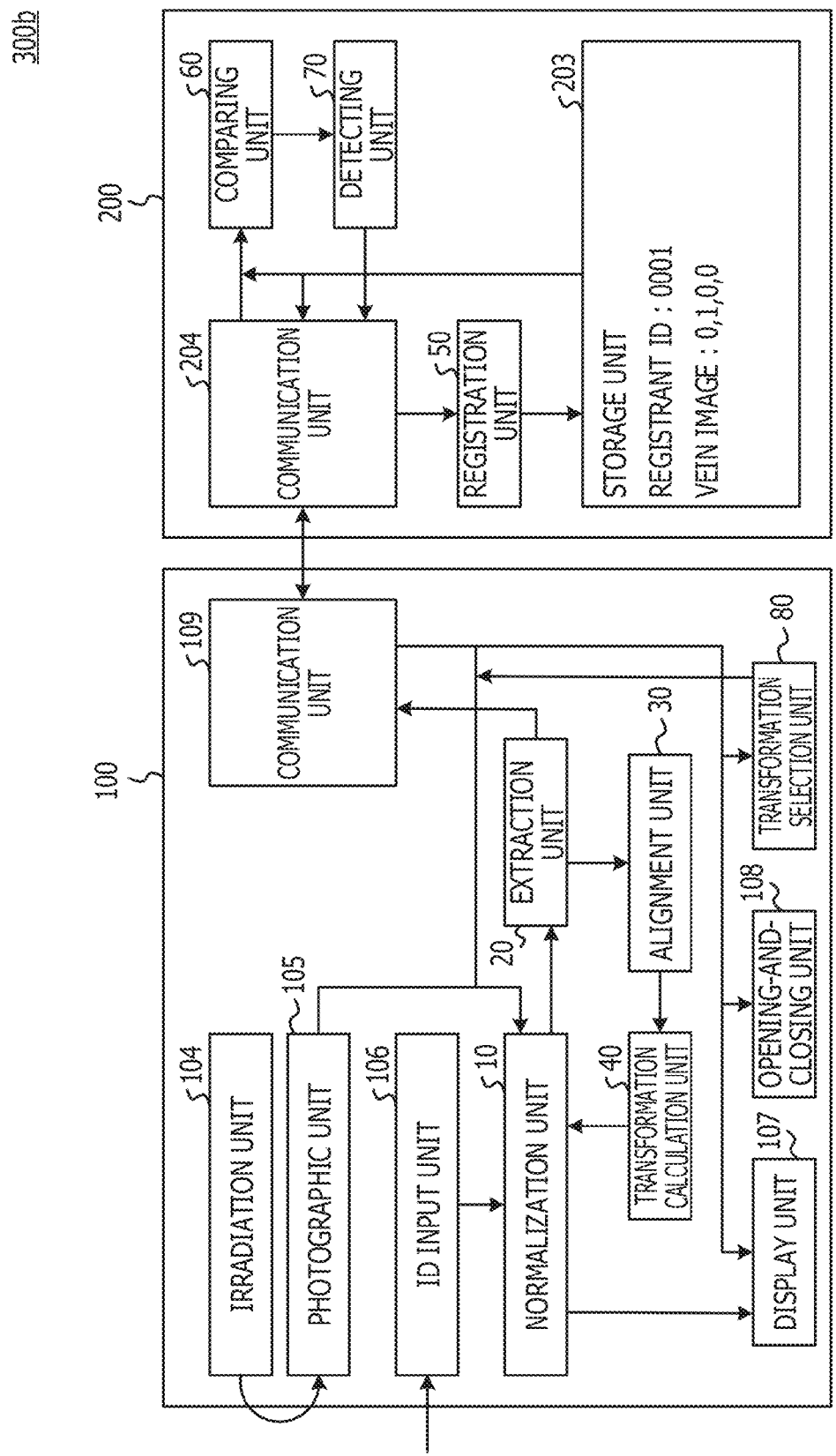
FIG. 13 is a functional block diagram of a biometric information authentication device according to a third embodiment.

In a third embodiment, a biometric information authentication device 300b that holds a plurality of sets of transformation coefficients will be described. As a hardware configuration of the biometric information authentication device 300b, a hardware configuration similar to that of the first embodiment may be used. FIG. 13 is a functional block diagram of the biometric information authentication device 300b. The biometric information authentication device 300b differs from the biometric information authentication device 300a according to the second embodiment in that biometric information authentication device 300b holds a plurality of sets of transformation coefficients. In the biometric information authentication device 300b, a biometric information processing program is executed, and thereby a transformation selection unit 80 is further implemented in the terminal 100.

FIG. 14 is a flowchart illustrating an outline of processing performed by the biometric information authentication device 300b at the time of registration. With reference to FIG. 14, processing of step S51 to step S53 and step S55 to step S56 of FIG. 11 is performed as processing of step S71 to step S75. Next, processing of step S57 of FIG. 11 is performed as processing of step S76, and processing of step S54 is performed as step S77. Next, processing of step S58 to step S63 of FIG. 11 is performed as processing of step S78 to step S83. If "No" is the determination in step S76, the display unit 107 displays an instruction given to the user to hold up again (step S84). If "Yes" is the determination in step S77, the alignment unit 30 performs alignment (step S85). Next, the transformation selection unit 80 selects a transformation coefficient (step S86). Thereafter, processing of step S87 is performed.

Subsequently, details of the transformation calculation unit 40 and the transformation selection unit 80 according to this embodiment will be described. It is assumed that n registered images, for transformation calculation, are input for each of m IDs. Hereinafter, one approach for calculating a plurality of sets of transformation coefficients for one pixel (u, v) of a normalized image will be illustrated. This is one expansion of a k-means method that is well known in the learning field.

It is assumed that j-th (j=1, . . . n) data of an i-th (i=1, . . . m) ID is represented as (i, j), and the outline is $s_{i,j}$. The result of alignment of vein images within the same ID is represented by mapping $T_{i,j}$. Additionally, It is assumed that the vector of a point corresponding to a pixel (u, v) of a normalized image determined by standard normalization processing is $p_{i,j}$. The meanings of them are similar to those in the second embodiment. Here, the following function with which the merit of the transformation coefficient θ is evaluated for data of the i-th ID is defined.

$$g_i(\theta) = \sum_{j=2}^{n} \|f(s_{i,j}; \theta) - T_{i,j}(f(s_{i,1}; \theta))\|^2 + \gamma \|f(s_{i,1}; \theta) - p_{i,1}\|^2$$

Here, γ is a small positive number, and may be, for example, 0.01. The first term of the above function represents a normalization error measured by the coordinate system of (i, j) with respect to the first image, and the second term represents displacement from a point determined by standard normalization processing. $\Sigma_i g_i$ compares the evaluation function $J_2$ of the second embodiment. L sets of transformation coefficients are to be obtained. It is assumed that L is, for example, 4. Transformation coefficients are distinguished by the number of l=1, . . . L. Each training data is classified into the corresponding class of L classes. A class to which the training data of the i-th ID belongs is described as $c_i$. By the following method, $c_i$ is determined.

(1) Initialization

The transformation calculation unit 40 assigns any one of integers ranging from 1 to L, in a random fashion, to $c_i$ (i=1, . . . m).

(2) Minimization of Evaluation Function

The transformation calculation unit 40 determines θ that minimizes an evaluation function $G_1(\theta)=\Sigma_{ci=l} g_i(\theta)$, and represents it as $\theta^{(l)}$.

(3) Reassignment of Class

The transformation calculation unit 40 determines l with which $g_i(\theta^{(l)})$ is minimum under the condition that l=1, L, for all i (i=1, . . . m), and changes the class to $c_i$=l.

(4) Repetition

The transformation calculation unit 40 finishes processing when assignment of a class will not change. Otherwise, the transformation calculation unit 40 performs minimization of an evaluation function again.

By repeating the aforementioned, the value of $\Sigma_i G_i(\theta^{(l)})$ decreases monotonously, and therefore at least the local minimum may be determined. The normalization errors decrease compared to the case where a single transformation coefficient is used, and therefore it is expected that the degree of similarity between data of the same person is further raised. As the final transformation coefficient, $\theta^{(1)}, \ldots \theta^{(L)}$ at the time of the end of the aforementioned method is used. Normalization for training data of the i-th ID is performed with the transformation coefficient $\theta^{(ci)}$. Note that while calculation has been performed independently for each pixel (u, v) of a normalized image in the aforementioned, it may be considered as a modification that, for example, an evaluation function averaged for all the calculated pixels (u, v) is used, and thus class assignment common to all the pixels (u, v) is performed. Thereby, the number of normalized images generated at the time of authentication may be reduced.

Subsequently, details of the transformation selection unit 80 will be described. For registered data other than training data, a transformation coefficient used for it is determined by a method mentioned below. The j-th outline of registered data is represented by $s_j$, and the result of alignment of vein images within the same ID is represented by mapping $T_j$. Additionally, it is assumed that the vector of a point corresponding to a pixel (u, v) of a normalized image determined by standard normalization processing is $p_j$. Here, the function of the following formula by which the merit of the transformation coefficient θ is evaluated for data of the i-th ID is defined. Here, the same value as used for $g_i$ mentioned above is used for γ and so forth.

$$g(\theta) = \sum_{j=2}^{n} \|f(s_j;\theta) - T_j(f(s_1;\theta))\|^2 + \gamma\|f(s_1;\theta) - p_1\|^2$$

For the set of transformation coefficients $\theta^{(1)}, \ldots \theta^{(L)}$ obtained by the aforementioned method, l with which $g(\theta^{(l)})$ is minimum under the condition that l=1, . . . L is determined. A transformation coefficient $\theta^{(l)}$ is used for normalization of this registered data. Note that, it may be considered, as a modification of this embodiment, that a plurality of sets of vein images are registered using all the transformation coefficients at the time of registration. In this case, the transformation selection unit becomes unnecessary.

According to this embodiment, alignment is performed based on extracted biometric information, and the amount related to coordinates is normalized based on a result of alignment, thereby enabling the degree of similarity for the same person to be raised without alignment in the comparing process. In addition, using a plurality of transformation coefficients may reduce normalization errors. Thereby, the degree of similarity for the same person may be raised.

Note that while, in each of the aforementioned embodiments, the biometric information authentication device is such that the terminal and the server are connected through communication units, the functions of the terminal and the server mentioned above may be provided within one device.

Additionally, it may be considered that, first, a vein image is extracted from a captured image, and then normalization is performed for the vein image. Additionally, it is possible to use information acquired from an image, such as a pixel value, other than feature points of an outline. Use of a palm print may be considered as biometric information other than the vein of a palm. This application is applicable to biometric authentication in general in which the shape of a photographing part has flexibility and biometric information does not have a specific structure.

As described above, while the embodiments of the present disclosure have been described in detail, the present disclosure is not limited to such specific embodiments and various modifications and changes may be made without departing from the spirit and scope described in the claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An authentication device comprising:
    a memory; and
    a processor coupled to the memory and configured to:
        acquire a plurality of images with regard to a certain living body,
        extract first biometric information from each of the plurality of images,
        perform an alignment between the plurality of images, based on the first biometric information,
        calculate a coefficient based on a feature of the certain living body, the feature being identified by a result of the alignment,
        generate a normalized image by normalizing at least one image from among the plurality of images based on the coefficient,
        extract a second biometric information from the normalized image,
        register the second biometric information and the coefficient into the memory,
        receive a request for an authentication including another image,
        generate another normalized image by normalizing the another image based on the coefficient stored in the memory,
        extract third biometric information from the normalized another image, compare the second biometric information to the third biometric information, determine whether the authentication is successful or not based on a result of a comparison, register an ID associated with the second biometric information and the coefficient into the memory, and when the request including the ID is received, generate the another normalized image by normalizing the another image based on the coefficient associated with the ID in the memory.

2. The authentication device according to claim 1, wherein the normalized image is generated by normalizing an amount related to coordinates of the at least one image, based on the coefficient regarding a difference between the feature and a standard model.

3. The authentication device according to claim 1, wherein the processor is further configured to:

when a number of registered biometric information is more than a threshold, select another coefficient from among a plurality of coefficients stored in the memory in advance, based on a result of the alignment, and normalize the at least one image using the another coefficient.

4. An authentication method executed by a processor, the authentication method comprising:

acquiring a plurality of images with regard to a certain living body;

first extracting, from each of the plurality of images, first biometric information;

performing alignment between the plurality of images, based on the first biometric information;

calculating a coefficient based on a feature of the certain living body, the feature being identified by a result of the alignment; and first generating a normalized image by normalizing at least one image from among the plurality of images based on the coefficient by the processor;

second extracting a second biometric information from the normalized image;

registering the second biometric information and the coefficient into a memory;

receiving a request for an authentication including another image;

second generating another normalized image by normalizing the another image based on the coefficient stored in the memory;

third extracting third biometric information from the normalized another image;

comparing the second biometric information to the third biometric information;

determining whether the authentication is successful or not based on a result by the comparing;

registering an ID associated with the second biometric information and the coefficient into the memory; and when the request including the ID is received, generating the another normalized image by normalizing the another image based on the coefficient associated with the ID in the memory.

5. The authentication method according to claim 4, wherein the first normalizing generates the normalized image by normalizing an amount related to coordinates of the at least one image, based on the coefficient regarding a difference between the feature and a standard model.

6. The authentication method according to claim 4, further comprising:

when a number of registered biometric information is more than a threshold, selecting another coefficient from among a plurality of coefficients stored in the memory in advance, based on a result of the alignment, and wherein the first normalizing normalizes the at least one image using the another coefficient.

7. An authentication method executed by one or more processors, the method comprising:

acquiring a plurality of images with regard to a certain living body;

first extracting, from each of the plurality of images, first biometric information;

performing alignment between the plurality of images, based on the first biometric information;

calculating a coefficient based on a feature of the certain living body, the feature being identified by a result of the alignment;

first generating a normalized image by normalizing at least one image from among the plurality of images based on the coefficient by the processor; and generating the normalized image by normalizing an amount related to coordinates of the at least one image, based on the coefficient regarding a difference between the feature and a standard model.

8. The authentication method according to claim 7, the process further comprising:

second extracting a second biometric information from the normalized image; and registering the second biometric information and the coefficient into a memory.

9. The authentication method according to claim 8, the process further comprising:

receiving a request for an authentication including another image;

second generating another normalized image by normalizing the another image based on the coefficient stored in the memory;

third extracting third biometric information from the normalized another image;

comparing the second biometric information to the third biometric information; and determining whether the authentication is succeed or not based on a result by the comparing.

10. The authentication method according to claim 9, further comprising:

registering an ID associated with the second biometric information and the coefficient into the memory, and when the request including the ID is received, generating the another normalized image by normalizing the another image based on the coefficient associated with the ID in the memory.

11. The authentication method according to claim 7, further comprising:

when a number of registered biometric information is more than a threshold, selecting another coefficient from among a plurality of coefficients stored in the memory in advance, based on a result of the alignment, and wherein the first normalizing normalizes the at least one image using the another coefficient.

* * * * *